US012631593B2

(12) United States Patent
Ham et al.

(10) Patent No.: US 12,631,593 B2
(45) Date of Patent: May 19, 2026

(54) ELECTROCHEMICAL MEASUREMENT APPARATUSES AND METHODS FOR MONITORING AND CONTROLLING PH

(71) Applicant: President and Fellows of Harvard College, Cambridge, MA (US)

(72) Inventors: Donhee Ham, Cambridge, MA (US); Young-Ha Hwang, Cambridge, MA (US); Henry Julian Hinton, Cambridge, MA (US); Han Sae Jung, Cambridge, MA (US); Woo-Bin Jung, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 55 days.

(21) Appl. No.: 18/294,759

(22) PCT Filed: Jun. 13, 2022

(86) PCT No.: PCT/US2022/033228
§ 371 (c)(1),
(2) Date: Feb. 2, 2024

(87) PCT Pub. No.: WO2023/014437
PCT Pub. Date: Feb. 9, 2023

(65) Prior Publication Data
US 2025/0067705 A1 Feb. 27, 2025

Related U.S. Application Data

(60) Provisional application No. 63/229,026, filed on Aug. 3, 2021.

(51) Int. Cl.
G01N 27/416 (2006.01)

(52) U.S. Cl.
CPC .............................. G01N 27/4167 (2013.01)

(58) Field of Classification Search
None
See application file for complete search history.

(56) References Cited

U.S. PATENT DOCUMENTS

| | | | |
|---|---|---|---|
| 6,093,302 | A | 7/2000 | Montgomery |
| 2014/0191294 | A1 | 7/2014 | Bikumandla et al. |

(Continued)

FOREIGN PATENT DOCUMENTS

| | | |
|---|---|---|
| WO | WO 2019/010343 A1 | 1/2019 |
| WO | WO 2023/183554 A1 | 9/2023 |
| WO | WO 2024/091986 A1 | 5/2024 |

OTHER PUBLICATIONS

S.R. Kumashi, et al., "A CMOS Multi-Modal Electrochemical and Impedance Cellular Sensing Array from Massively Paralleled Exoelectrogen Screening", IEEE Transactions on Biomedical Circuits and Systems, 15(2): p. 221-234, Apr. 2021.*

(Continued)

*Primary Examiner* — J. Christopher Ball
(74) *Attorney, Agent, or Firm* — Wolf, Greenfield & Sacks, P.C.

(57) ABSTRACT

An electrochemical apparatus includes an array of pixels disposed on a chip, stimulator circuitry disposed on the chip and configured to provide electrical input signals to cause stimulation of the pixels of the array, and sensor circuitry disposed on the chip and configured to read electrical output signals from the pixels of the array. The stimulator circuitry is configured to provide the input signals to cause stimulation of the pixels individually, and the sensor circuitry is configured to selectively read the output signals from the pixels while the pixels are being stimulated. The sensor circuitry is configured to measure an open-circuit voltage at each of the pixels and a current flow at each of the pixels while the pixels are being stimulated by the stimulator (Continued)

circuitry. The open-circuit voltage may be measured while the current flow is being measured.

19 Claims, 11 Drawing Sheets

(56)            References Cited

U.S. PATENT DOCUMENTS

| | | |
|---|---|---|
| 2018/0334708 A1 | 11/2018 | Rothberg et al. |
| 2024/0210380 A1 | 6/2024 | Ham et al. |
| 2024/0255461 A1 | 8/2024 | Park et al. |
| 2024/0280535 A1 | 8/2024 | Ham et al. |

OTHER PUBLICATIONS

Invitation to Pay Additional Fees for Application No. PCT/US2022/33228 mailed Sep. 28, 2022.
International Search Report and Written Opinion for Application No. PCT/US2022/33228 mailed Jan. 4, 2023.
International Preliminary Report on Patentability for Application No. PCT/US2022/33228 mailed Feb. 15, 2024.
Abbott et al., The Design of a CMOS Nanoelectrode Array with 4096 Current-Clamp/Voltage-Clamp Amplifiers for Intracellular Recording/Stimulation of Mammalian Neurons. IEEE J Solid-State Circuits. Sep. 2020;55(9):2567-2582. doi: 10.1109/jssc.2020.3005816. Epub Jul. 9, 2020. Author manuscript, 43 pages.
Dragas et al., A Multi-Functional Microelectrode Array Featuring 59760 Electrodes, 2048 Electrophysiology Channels, Stimulation, Impedance Measurement and Neurotransmitter Detection Channels. IEEE J Solid-State Circuits. Jun. 2017;52(6):1576-1590. doi: 10.1109/JSSC.2017.2686580. Epub Apr. 27, 2017. Author manuscript, 31 pages.
Jung, CMOS Multi-Modal Integrated Systems for Future Bioelectronics and BioSensors. Dissertation presented at the Georgia Institute of Technology. Atlanta, Washington. Dec. 2020. 150 pages.
Kato et al., High-Density and Large-Scale MEA System Featuring 236,880 Electrodes at 11.72 μm Pitch for Neuronal Network Analysis. IEEE Symposium on VLSI Circuits. Jun. 2020: pp. 1-2, doi: 10.1109/VLSICircuits18222.2020.9162947.

\* cited by examiner

ELECTROCHEMICAL MEASUREMENT APPARATUSES AND METHODS FOR MONITORING AND CONTROLLING PH

CROSS REFERENCE TO RELATED APPLICATIONS

The present application is a national stage filing of International Patent Application Serial No. PCT/US2022/033228, filed Jun. 13, 2022, entitled "ELECTROCHEMICAL MEASUREMENT APPARATUSES AND METHODS FOR MONITORING AND CONTROLLING pH," by Ham et al., which claims the benefit of priority of U.S. Provisional Application No. 63/229,026 filed Aug. 3, 2021, entitled "ELECTROCHEMICAL MEASUREMENT APPARATUSES AND METHODS FOR MONITORING AND CONTROLLING pH," the entire contents of each of which is incorporated by reference herein.

GOVERNMENT SUPPORT

This invention was made with government support under 2019-19081900002 awarded by Intelligence Advanced Research projects Activity (IARPA). The government has certain rights in the invention.

FIELD OF THE INVENTION

The present invention generally relates to apparatuses and methods for performing an electrochemical reaction and measuring electrical signals arising from the electrochemical reaction. More specifically, the present invention relates to apparatuses and methods for performing a plurality of electrochemical reactions and simultaneously measuring electrical signals arising from the electrochemical reactions, to monitor and control local chemical characteristics of a plurality of environments of the reactions and provide chemically-diverse sources for use in screening for biological activity and/or in preparation of chemical libraries.

BACKGROUND

Molecular reactions may be used in a wide variety of applications, such as to screen for biological activity and to prepare chemical libraries. In some instances, these reactions may be manipulated electrochemically, enabling localized control of individual reaction sites via controlled application of electrical signals. Progress of the electrochemical reactions may be observed by monitoring the sites for changes. In some cases, in order to perform multiple electrochemical reactions for a statistically reliable assessment, an array of reaction sites may be used to perform electrochemical reactions in parallel. An increase in the number of reaction sites, however, also may increase the complexity of controlling the electrochemical reactions (e.g., to ensure uniform and/or precise/accurate conditions), and also may increase the complexity of monitoring the sites.

SUMMARY OF THE DISCLOSURE

Control of pH may enable quantitative control of a wide range of pH-dependent chemical and biochemical processes. By creating multiple local pH microenvironments that can be used in parallel, these processes can be greatly parallelized and densified. Synthesis applications, such as microarray synthesis of DNA and peptides, often require an array-wide localization of pH to facilitate spatio-selective removal of protecting groups from existing strands for further elongation. However, dense, array-wide confinement of pH can be very challenging due to fast diffusion of protons. Thus, improvements are needed to realize dense localization of pH across a micro-electrode array.

Disclosed herein are electrochemical apparatuses and methods for electrically controlling and monitoring a local chemical characteristic of an environment. According to some aspects of the technology disclosed herein, an electrochemical apparatus may be provided for electrically manipulating a plurality of local environments, also referred to as "microenvironments" herein, and monitoring each microenvironment's pH. The microenvironments may be manipulated in parallel or sequentially or a combination both. The electrochemical apparatus may be comprised of a semiconductor device, which may be produced using complimentary metal-oxide-semiconductor (CMOS) technology. The semiconductor device may provide a platform that can be used for biomedical or other applications. In some aspects of the present technology, the semiconductor device may be structured as an array of microenvironments that may be operatively connected to circuitry for providing signals to and receiving signals from the microenvironments. For example, the circuitry may be provided as an array of circuits located underneath the array of microenvironments, and each circuit may be electrically connected to electrodes in a corresponding one of the microenvironments. In some aspects of the present technology, to connect with the electrodes in a large array (e.g., 10,000 microenvironments or greater, or 30,000 microenvironments or greater, or 90,000 microenvironments or greater, or 120,000 microenvironments or greater, or 130,000 microenvironments or greater, or 140,000 microenvironments or greater, etc.), the circuitry may be fabricated on a single silicon (Si) wafer having a dimension that is at least the same as or larger than that of the large array.

In some aspects of the present technology, the surface of the semiconductor device may be comprised of electrochemical pixels that are spatially arranged in a pixel array. The pixel array may be comprised of an array of electrochemical cells and an array of pixel circuits configured to enable each of the electrochemical cells to be addressed individually. In some aspects of the technology disclosed herein, the pixel circuits may provide electrical stimulation to the electrochemical cells and/or may detect electrical signals from the electrochemical cells in real-time. In some aspects of the disclosed technology, detection of the signals from the electrochemical cells may take place while the electrochemical cells are being stimulated. In some aspects of the disclosed technology, there may be a one-for-one arrangement of the electrochemical cells and the pixel circuits, such that each electrochemical cell is stimulated by a corresponding pixel circuit, which also detects signals from that electrochemical cell. As will be appreciated, use of standard semiconductor processing technology (e.g., CMOS fabrication technology) may enable the pixels to be produced at a lower cost than in cases where development of new fabrication procedures would be required.

In some aspects of the present technology, electrical stimulation and monitoring of electrochemical reactions may take place at each electrochemical cell of an array of electrochemical cells (also referred to as "electrode cells" herein). The array of electrode cells may be part of a CMOS integrated circuit, with each electrode cell of the array being individually addressable. Further, each electrode cell may be comprised of individually addressable electrodes. In addition to the array of pixel circuits, the CMOS integrated circuit may also comprise circuitry (e.g., shift registers) for addressing each of the electrode cells. Each electrode cell may be comprised of a pair of electrodes (e.g., an anode and cathode pair) configured for localized stimulation, and one or more sensing electrodes for monitoring open-circuit potentials or voltages of the electrode cell (e.g., between electrodes). Each electrode cell may be associated with its own pixel circuit, which is circuitry corresponding to the electrode cell. For example, an electrode cell may be associated with an integrated digital memory that stores configuration bits for routing the electrodes to a switch network associated with the electrode cell. The switch network may be configured to selectively connect the electrodes to stimulation voltages or to one or more current stimulator(s) associated with the electrode cell, which can deliver a desired current into/out of the pair of electrodes (e.g., the anode and cathode pair). A group of one or more electrode cells of the array may share one or more voltage(s) from an array voltage generator for both voltage and current stimulation. The array voltage generator may be a global generator used by the electrode cells of the array. Groups of electrode cells may be coupled to sensor circuitry in a time-interleaved (e.g., time-division multiplexed) manner through multiplexers. The array of electrode cells may be arranged in rows and columns, and each group of electrode cells may be comprised of one or more columns (or rows) of electrode cells. The sensor circuitry may be configured to measure both open-circuit voltage (OCV) and current flow at any electrode of an electrode cell while stimulation is applied at the electrode. By sharing some hardware used for stimulation and sensing, a large number of electrode cells may be formed on the same semiconductor chip together with the shared hardware. For example, CMOS processing technology may be used to fabricate the shared hardware for stimulation and sensing as well as the array of the electrode cells and the array of pixel circuits on the same semiconductor wafer. As will be appreciated, having on-chip circuitry (e.g., shift registers) for addressing the electrode cells facilitates scaling up of the number of electrode cells that may be provided for electrochemical reactions. The CMOS integrated circuit may optionally be provided with one or more on-chip temperature sensors to measure, e.g., a temperature of the electrode cells during an electrochemical reaction.

According to an aspect of the technology of the present disclosure, an electrochemical apparatus may be comprised of an array of pixels disposed on a chip; stimulator circuitry disposed on the chip and configured to provide electrical input signals to cause stimulation of the pixels of the array; and sensor circuitry disposed on the chip and configured to read electrical output signals from the pixels of the array. The stimulator circuitry may be configured to provide the input signals to cause stimulation of the pixels individually. The sensor circuitry may be configured to selectively read the output signals from the pixels while the pixels are being stimulated.

According to various embodiments of this aspect, a total number of pixels in the array of pixels may be in a range of 10,000 pixels to 120,000 pixels, or may be in a range of 30,000 pixels to 120,000 pixels. In various embodiments, the array of pixels may be comprised of at least 120,000 pixels.

According to various embodiments of this aspect, the sensor circuitry may be configured to measure an OCV at each of the pixels while the pixels are being stimulated by the stimulator circuitry. In some embodiments, the sensor circuitry may be configured to measure a current flow at each of the pixels while the pixels are being stimulated by the stimulator circuitry. In some embodiments, the sensor circuitry may be configured to measure the OCV while the current flow is being measured.

According to various embodiments of this aspect, the array of pixels may be comprised of pixel groups, the stimulator circuitry may include an array voltage generator configured to provide stimulation voltages to the pixels of at least one of the pixel groups of the array, and the sensor circuitry may include sensing channels, with each sensing channel being comprised of circuitry configured to read the output signals of the pixels of a corresponding one of the pixel groups. In some embodiments, each pixel group may be comprised of at least one column of pixels (e.g., four columns of pixels). In some embodiments, the array voltage generator may be comprised of a first generator portion and a second generator portion, and each of the first and second generator portions may be comprised of: a digital-to-analog converter (DAC), primary and secondary buffers configured to receive an output voltage of the DAC, and primary and secondary output switches configured to selectively connect the primary buffer or the secondary buffer to an output of the generator portion. In some implementations, each of the primary and secondary buffers may be a sample and hold buffer. In some implementations, each of the primary buffers may be comprised of a programmable transimpedance amplifier (TIA) configured to measure a current consumed by pixels of a corresponding pixel group. In some implementations, the primary and secondary buffers may be configured to perform an auto-zeroing process to reduce offset variations of the output voltage of the DAC relative to a predetermined voltage. For example, the auto-zeroing process may reduce the offset variations to less than 0.1 mV. In some embodiments, the DAC may be a split-capacitor DAC (CDAC). In some embodiments, the DAC may be comprised of a plurality of resistors.

According to various embodiments of this aspect, the apparatus may further be comprised of a controller configured to: provide control signals to the stimulator circuitry to control the stimulator circuitry to stimulate the pixels of the array, and provide control signals to the sensor circuitry to selectively route the output signals from the pixels to sensing channels of the sensor circuitry. In some embodiments, the controller may be comprised of a microprocessor operatively coupled to a storage device storing computer-readable code for: controlling an electrochemical stimulation procedure of the electrochemical apparatus, recording measurement data of the electrochemical apparatus, and providing a user interface to a display device to enable a user to input parameters for the electrochemical stimulation procedure. In some embodiments, the input parameters may include configuration parameters for configuring the electrochemical apparatus. In some embodiments, the controller may be comprised of a field-programmable gate array (FPGA) configured to: receive the input parameters, output the control signals to the stimulator circuitry and the sensor circuitry, and record measurement data from the sensor circuitry. In some embodiments, the FPGA may be configured to record aggregated measurement data.

According to some embodiments of this aspect, the apparatus may further be comprised of at least one temperature sensor configured to measure a temperature of a reaction surface of the array of pixels. In some embodiments, there may be two or more temperature sensors arranged adjacent the array of pixels. In some embodiments, the at least one temperature sensor may be comprised of at least one temperature-to-frequency converter circuit configured to output a digital signal representing the measured temperature.

According to some embodiments of this aspect, the stimulator circuitry may be comprised of an array of pixel circuits. The array of pixels may be comprised of an array of electrochemical cells overlaying the array of pixel circuits, with each of the pixel circuits being operatively connected to a corresponding one of the electrochemical cells. In some embodiments, each pixel of the array of pixels may be comprised of a pixel circuit operatively connected to an electrochemical cell overlaying the pixel circuit. In some embodiments, for each pixel of the array of pixels, the electrochemical cell may be comprised of a plurality of electrodes arranged on an electrode level of the chip, and the pixel circuit may be electrically connected to the electrodes of the electrochemical cell and may be arranged on a pixel-circuitry level of the chip between the electrode level and a substrate of the chip.

According to some embodiments of this aspect, for each pixel of the array of pixels, the electrodes of the electrochemical cell may be comprised of: first and second stimulation electrodes, and first and second sensing electrodes. The first and second stimulation electrodes may be arranged as concentric rings and have a common region. The first sensing electrode may be located within the common region, and the second sensing electrode may be located outside of the common region and outside of the concentric rings. In some embodiments, for each pixel of the array of pixels, the first and second stimulation electrodes may be connected to the stimulator circuitry. In some embodiments, for each pixel of the array of pixels, the first and second stimulation electrodes may be connected to the stimulator circuitry, and the first and second sensing electrodes and the first and second stimulation electrodes may be connected to the sensor circuitry. In some implementations, the first and second sensing electrodes may be configured to detect an open-circuit voltage of the electrochemical cell and to output a signal corresponding to the detected open-circuit voltage.

According to various embodiments of this aspect, the array of pixels may be comprised of a plurality of pixel groups. The stimulator circuitry may be comprised of an array voltage generator operatively connected to the pixel groups and configured to provide an anode voltage and a cathode voltage to a selected pixel group via the pixel circuits of the selected pixel group. In some embodiments, each of the pixel circuits of the selected pixel group may be configured to selectively provide one of: a cathode stimulation current to the first stimulation electrode, a cathode stimulation voltage to the first stimulation electrode, an anode stimulation current to the second stimulation electrode, and an anode stimulation voltage to the second stimulation electrode. In some embodiments, each of the pixel circuits of the selected pixel group may be configured to selectively provide bidirectional currents to the first and second stimulation electrodes, such that the first and second stimulation electrodes selectively may be: cathode and anode electrodes, respectively, or anode and cathode electrodes, respectively.

According to various embodiments of this aspect, the array of pixels may be comprised of a plurality of macro-pixels, with each macro-pixel being comprised of a group of four or more pixels. In some embodiments, for each macro pixel, the first stimulation electrodes of the group of pixels may be commonly connected to each other and may collectively form a first common stimulation electrode, and the second stimulation electrodes of the group of pixels may be commonly connected to each other and may collectively form a second common stimulation electrode. In some embodiments, for each macro pixel, a single one of the second sensing electrodes of the group of pixels may be used as a common sensing electrode. For example, the single one of the second sensing electrodes used for the common sensing electrode may be centrally located in the macro pixel. Alternatively, in some embodiments, two or more of the second sensing electrodes of the group of pixels may be commonly connected to each other and may collectively form the common sensing electrode.

According to various embodiments of this aspect, each pixel circuit of the array of pixels may be comprised of: a voltage stimulator configured to receive a voltage signal from the array voltage generator and to output a stimulation voltage, a current stimulator configured to receive the voltage signal from the array voltage generator and to output a stimulation current, and a plurality of switches configured to enable the stimulation voltage or the stimulation current to be provided to a selected electrode of the electrochemical cell corresponding to the pixel circuit. In some embodiments, the stimulator circuitry may be further comprised of a clock generator configured to provide clock signals to the array voltage generator and the pixel circuits. In some embodiments, the current stimulator may be comprised of a switched capacitor controlled by clock signals from the clock generator. In some implementations, the clock signals may be comprised of first and second clock signals configured to control first and second switches of the current stimulator such that the stimulation current has a resolution of 0.1 nA. In some other implementations, the resolution of the stimulation current may be in a range of 0.1 nA to 1 μA, or in a range of 0.1 nA to 100 μA, or in a range of 1 nA to 500 μA. In some implementations, the first and second clock signals may be non-overlapped signals.

According to some embodiments of this aspect, each pixel circuit of the array of pixels may be comprised of a pixel memory operatively connected to the voltage stimulator and the current stimulator. The pixel memory may store configuration bits useable for selection of the voltage signal from a plurality of voltages available from the array voltage generator.

According to some embodiments of this aspect, each pixel circuit of the array of pixels may be comprised of: a cathode stimulator configured to receive a cathode voltage signal from a first generator portion and to output a stimulation voltage or a stimulation current to the first stimulation electrode of the electrochemical cell corresponding to the pixel circuit, an anode stimulator configured to receive an anode voltage signal from a second generator portion and to output a stimulation voltage or a stimulation current to the second stimulation electrode of the electrochemical cell corresponding to the pixel circuit, and a plurality of switches. The switches may be configured to: enable the first stimulation electrode to be provided the stimulation voltage from the cathode stimulator and to enable the second stimulation electrode to be provided the stimulation voltage from the anode stimulator, or enable the first stimulation electrode to be provided the stimulation current from the cathode stimulator and to enable to the second stimulation electrode to be provided the stimulation current from the anode stimulator. In some embodiments, each pixel circuit of the array of pixels may be comprised of a first multiplexer operatively connected to the cathode stimulator and the array voltage generator. The first multiplexer may be configured to provide one of a plurality of cathode voltages generated by the array voltage generator, with the cathode voltage signal being selected from the cathode voltages.

Each pixel circuit may further be comprised of a second multiplexer operatively connected to the anode stimulator and the array voltage generator. The second multiplexer may be configured to provide one of plurality of anode voltages generated by the array voltage generator, with the anode voltage signal being selected from the anode voltages. In some embodiments, each pixel circuit of the array of pixels may be comprised of a memory operatively connected to the cathode stimulator and the anode stimulator. The memory may store configuration bits for selection of the cathode voltage signal by the cathode stimulator and for selection of the anode voltage signal by the anode stimulator.

According to some embodiments of this aspect, the array of pixels may be comprised of columns of pixels. The sensor circuitry may be comprised of sensing channels, with each sensing channel being comprised of circuitry configured to read output signals of the pixels of a corresponding one of the columns of pixels. Each pixel circuit may be comprised of a network of electrode-sensing switches that enable each of the first and second stimulation electrodes and each of the first and second sensing electrodes to be selectively sensed for a current and/or a voltage. In some embodiments, each of the sensing channels may be comprised of a readout switch comprised of a TIA. The readout switch may be configured to selectively enable current to be sensed via the TIA or voltage to be sensed. In some embodiments, the sensor circuitry may be comprised of a channel multiplexer operatively connected to the sensing channels and configured to control selective readout from the sensing channels. In some embodiments, each of the sensing channels may be comprised of an analog-to-digital converter (ADC) configured to receive a signal from the TIA and to provide a digital signal to the channel multiplexer.

According to another aspect of the present technology, a method for performing an electrochemical reaction is provided. The method may be comprised of: providing a stimulation current to a plurality of pixels disposed on a chip; and measuring an open-circuit voltage (OCV) at each of the pixels during the providing of the stimulation current. The measuring of the OCV may be performed using sensor circuitry disposed on the chip.

In some embodiments of this aspect, the method may further be comprised of measuring a current flow at each of the pixels during the providing of the stimulation current. The measuring of the current flow may be performed using the sensor circuitry. In some embodiments, the measuring of the current flow may be performed during the measuring of the OCV. In some embodiments, the providing of the stimulation current may be comprised of providing the stimulation current to a cathode electrode or an anode electrode of each of the pixels. In some embodiments, the stimulation current may be provided simultaneously to each of the pixels.

According to various embodiments of this aspect, the sensor circuitry may be comprised of a plurality of pixel circuits respectively disposed under electrodes of the pixels. The measuring of the OCV may be comprised of measuring a potential between first and second sensor electrodes of each of the pixels using the pixel circuits corresponding the pixels. In some embodiments, the method may further be comprised of: selecting, by each of the pixel circuits, a voltage from a plurality of voltages provided by a multiplexer; and producing the stimulation current from the selected voltage. The providing of the stimulation current may be performed by each of the pixel circuits. In some embodiments, each of the pixels may be comprised of an in-pixel memory storing configuration bits. The selecting of the voltage by each of the pixel circuits may be performed according to configuration bits in the in-pixel memory of a corresponding one of the pixels.

According to various embodiments of this aspect, the pixels may be arranged in a plurality of pixel groups, the sensor circuitry may be comprised of a plurality of sensor channels, and the measuring of the OCV may be performed by each of the sensor channels for a corresponding one of the pixel groups.

According to various embodiments of this aspect, the pixels may be arranged in a plurality of pixel groups, the sensor circuitry may be comprised of a plurality of sensor channels, and the measuring of the current flow may be comprised of measuring by each of the sensor channels a cumulative current flow for a corresponding one of the pixel groups.

According to some embodiments of this aspect, the providing of the stimulation current and the measuring of the OCV may be performed for at least 10,000 pixels simultaneously, or at least 120,000 pixels simultaneously.

BRIEF DESCRIPTION OF THE DRAWINGS

A skilled artisan will understand that the accompanying drawings are for illustration purposes only. It is to be understood that in some instances various aspects of the present invention may be shown exaggerated or enlarged to facilitate an understanding of the invention. In the drawings, like reference characters generally refer to like features, which may be functionally similar and/or structurally similar elements, throughout the various figures. The drawings are not necessarily to scale, as emphasis is instead placed on illustrating and teaching principles of the various aspects of the present technology. The drawings are not intended to limit the scope of the claims or the present disclosure in any way. In the drawings:

DETAILED DESCRIPTION

Figure 1:
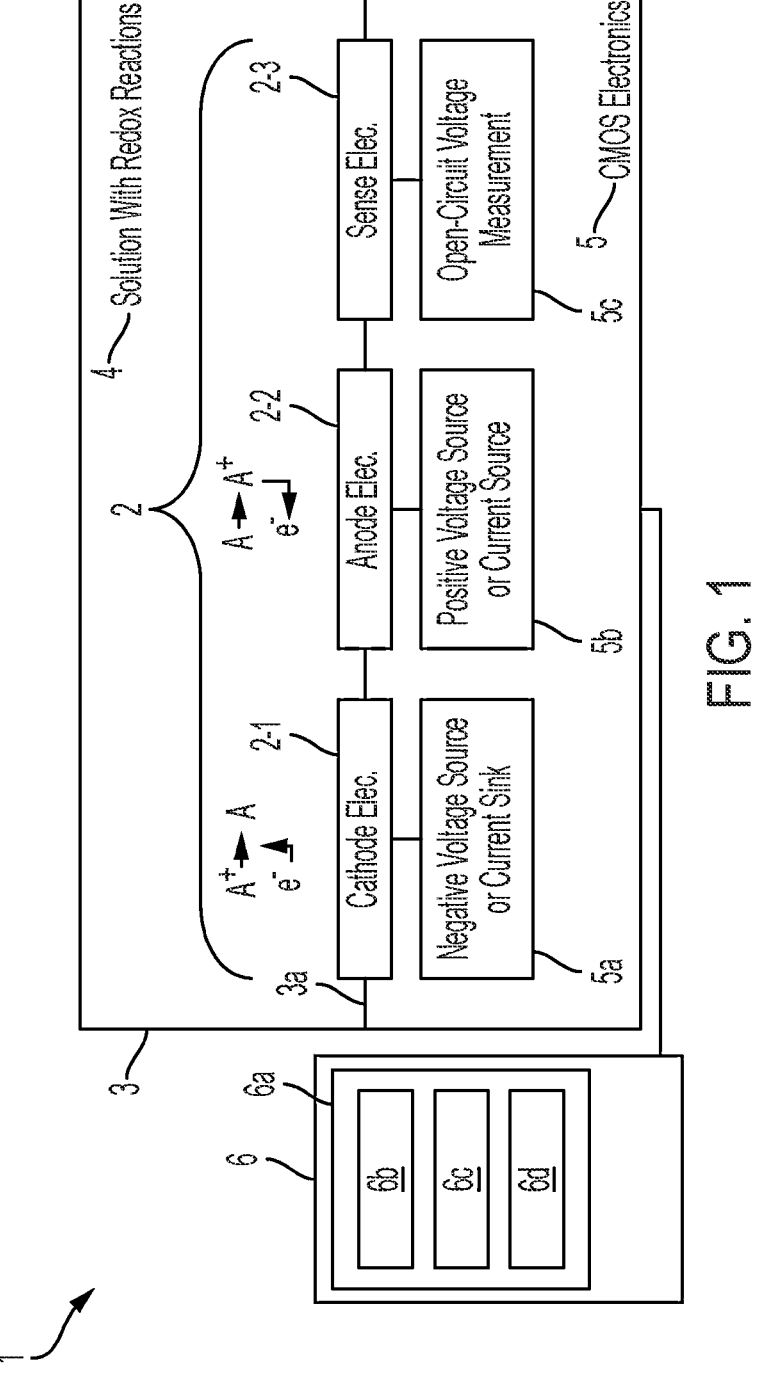
FIG. 1 schematically depicts a cross-sectional diagram of an electrochemical apparatus 1, according to some embodiments of the present technology.

Apparatuses and methods for controlling local pHs of regions of a solution (e.g., for parallelized polymer synthesis) are described herein. In various embodiments of the disclosed technology, these apparatuses and methods may offer one or more advantages to conventional techniques. Such advantages may include any one or any combination of: an ability to control a local pH of a microenvironment using one or more pixels of an array of pixels; an ability to sense or monitor respective local pHs associated with a plurality of pixels of the array; an ability to, for each pixel of the array, control the local pH of the pixel's microenvironment and simultaneously monitor the local pH of the microenvironment; and an ability to selectively control and/or monitor the respective pHs of thousands of microenvironments by selectively addressing the pixels of the array. In some embodiments of the apparatuses and methods of the present technology, each pixel of an array of pixels may be used to selectively synthesize a polymer sequence, such that different polymer sequences may be synthesized by different pixels of the array, or a same polymer sequence may be synthesized by the pixels of the array, or different polymer sequences may be synthesized by different groups of one or more pixels of the array. In some embodiments, each microenvironment may be associated with a single pixel of an array or a group of two or more pixels of the array. In some embodiments, each pixel of an array may be comprised of electrodes configured to apply an electrical current or an electrical potential to a solution comprised of an electrically sensitive pH modifier. In some cases, a reaction of the electrically sensitive pH modifier may cause a change in pH, and this change may be local to the pixel.

Controlling local pHs of environments is an important and challenging part of certain methods of parallel chemical synthesis, such as parallel synthesis of macromolecules. Improvements in techniques for parallel chemical synthesis of macromolecules may be advantageous for applications that rely on efficient parallel synthesis (e.g., synthesis of DNA sequence libraries, etc.). The present disclosure relates generally to apparatuses and methods for controlling the local pHs of regions of a solution, which may be useful for various applications including, but not limited to, parallel chemical synthesis of macromolecules, e.g., by precisely controlling and sensing, with high spatial resolution, local chemical environments of the parallel chemical synthesis.

In some cases, the ability to detect pH at each of a plurality of pixels may be advantageous for monitoring individual reaction conditions and/or calibrating circuitry used to control and/or detect pH. Additionally, according to some embodiments of the present technology, an array of pixels may be comprised of electrodes and circuitry configured to enable an open-circuit potential (OCP) to be sensed at each pixel as well as between adjacent pixels. The terms OCP and OCV may be used interchangeably herein. By monitoring the OCP, the apparatuses and methods of the present technology may enable pH to be sensed locally in a microenvironment of a pixel and also may enable pH to be sensed locally in a region between adjacent pixels. For example, in an array of rows and columns of pixels, a local pH of a pixel of interest may be sensed, a pH of a region between the pixel of interest and a pixel in an adjacent row may be sensed, and a pH of a region between the pixel of interest and a pixel in an adjacent column may be sensed. By being able to sense the pHs of regions surrounding the pixel of interest, the apparatuses and methods of the disclosed technology may enable a determination of whether surrounding conditions are affected by (or have an effect on) the pixel of interest. In some embodiments, the apparatuses and methods of the present technology may be used to sense a local pH of a microenvironment comprised of a macro-pixel formed of a plurality of pixels, and also to sense local pHs of regions surrounding the macro-pixel.

According to some embodiments of the present technology, independent control of currents through the solution, such as a current between a first electrode and a second electrode of a pixel, may be used to control a local pH of the solution proximate the pixel. Other techniques, such as voltage-control techniques, are also possible in other embodiments.

In some embodiments of the present technology, a microenvironment may be comprised of a square array of pixels, which may be used to control a local pH of a solution in the microenvironment. For example, the pixels may be used to control local currents and/or local voltages used to cause a reaction of an electrically sensitive pH modifier (e.g., a current-sensitive pH modifier or a voltage-sensitive pH modifier) at each pixel. Quinone is an example of an electrically sensitive pH modifier that may be used in some electrochemical reactions. Electrically sensitive pH modifiers may react to a voltage and/or a current by altering their proton state, e.g., by producing or consuming $H^+$. Increasing the voltage may, for example, result in deprotonation of an acid, resulting in the formation of an electrically sensitive conjugate and a change in the local pH. Accordingly, by directly (via voltage application) or indirectly (via current injection) controlling the voltage around quinone or another electrically sensitive pH modifier, the pH of the surrounding solution (i.e., the local pH) may also be controlled. In some embodiments, the local pH at each pixel may be controlled independently of the local pHs of other pixels within the array by, for instance, controlling the voltage and/or the current applied between first and second electrodes of each pixel.

According to some embodiments of the present technology, an electrically sensitive pH modifier may be controlled by controlling a voltage and/or a current in a first subset of pixels in an array of pixels to produce a pH change without, e.g., producing the pH change in a second subset of pixels of the array. For instance, changing the voltage and/or the current within the first subset of pixels may alter the protonation state of the electrically sensitive pH modifier local to the first subset, thereby controlling the pH. In some embodiments, controlling the protonation state of the electrically sensitive pH modifier, and thus the pH, may be useful for forming distinct polymer sequences (e.g., certain DNA sequences) but the same protonation state may not be useful for forming other polymer sequences.

It should be understood, however, that the examples provided above are for explanation and/or illustration and are not to be construed as limitations of the technology disclosed herein. Other aspects and embodiments of the present technology are discussed below.

Certain aspects of the present disclosure are directed to devices comprising integrated circuits. According to certain embodiments of the disclosed technology, integrated circuits may be comprised of one or more pixels. In some embodiments, each pixel may include a configuration of electrodes that may be used to control pH, such as, for example, the pH of a solution near the pixel. In some embodiments, the solution may be contained, at least in part, by a substrate comprised of one or more integrated circuit(s). For instance, the integrated circuit(s) may be present within a portion of the substrate and may be used to control the pH of the solution contained by the substrate. In some other embodiments, the solution and the integrated circuit(s) may be held in a container such that the solution is in contact with at least a portion of the integrated circuit(s).

As noted above, various aspects of the present disclosure involve an array of pixels each configured to control a local pH of a solution. For example, according to certain embodiments, some or all of the pixels of the array may each be configured to control the local pH of the solution by voltage stimulation, in which a potential (e.g., a voltage) is applied to electrodes of the pixel. In certain other embodiments, the local pH may be controlled by current stimulation, in which a current is applied to the electrodes of the pixel. In some embodiments, a first group of one or more pixels of the array may be stimulated using a first potential or a first current while a second group of one or more pixels of the array may be stimulated using a second potential or a second current.

Regardless of the mode of stimulation, a local pH of a solution near a pixel may be monitored by OCP sensing, i.e., by measuring an open circuit potential at one or more electrodes of the pixel. In some embodiments, stimulation may be exclusively by voltage stimulation, exclusively by current stimulation, or may be configured differently with a first subset of pixels employing voltage stimulation, and a second subset of pixels employing current stimulation using the configurable pixel circuits, as described below.

The pixels may control pH locally within a proximate region of the solution (e.g., a radially-symmetric region of the solution within or proximate the electrodes of the pixels). In some embodiments, the pixels may define sites (e.g., reaction sites) proximate the pixels. For example, in some embodiments of the disclosed technology, each pixel may define a reaction site based on its ability to control the local pH of that site, (e.g., the pH of a solution contacting that site).

As noted above, electrochemical reactions may be used in a wide variety of applications. For example, in addition to controlling local pHs of a plurality of microenvironments for the purpose of chemical synthesis, electrochemical reactions may be used in molecular reactions to, e.g., screen for biological activity. Some molecular reactions may be manipulated electrochemically, which may enable localized control of individual reaction sites via controlled application of electrical signals. Progress of the electrochemical reactions may be observed by monitoring the sites for changes. In some cases, in order to perform multiple electrochemical reactions for a statistically reliable assessment, an array of reaction sites may be used to perform a large number of electrochemical reactions in parallel.

There has been an increasing need for spatially organized, programmatic molecular reactions, which may be used to provide chemically diverse sources for use in, e.g., preparation of chemical libraries and screening for biological activity. Micro-electrode arrays (MEAs) have been used as platforms for investigating electrogenic cells (e.g., through electrical stimulation and recording of results) and also for electrochemical synthesis reactions.

In typical MEAs, active electrode arrays may be used to generate reduction-oxidation ("redox") reactions that occur at an electrode-electrolyte interface, when a voltage or a current is applied to desired electrodes. Typical MEA systems (e.g., for electrophysiology applications, for electrochemical synthesis applications) use a voltage stimulation scheme, because a stimulation voltage can be easily shared and selectively applied via an on-chip switch network. Voltage stimulation schemes, however, operate to maintain a potential of an electrode pair.

The inventors have recognized and appreciated that, for some applications, voltage stimulation schemes may not be as sensitive as a scheme based on a reaction-dependent charge. The inventors also have recognized and appreciated that current stimulation may be used advantageously to exert a higher level of accuracy in controlling an electrochemical reaction rate than voltage stimulation, because current stimulation may enable a level of quantitative control over reactions. Such quantitative control of, e.g., redox reactions, may be of high importance in realizing localized control of individual reaction sites. The inventors have recognized and appreciated that, for current stimulation, the current may not be evenly distributed and may depend on a local impedance at each electrode where the current is shared, and therefore each electrode should have an individual current-based stimulator. Otherwise, only electrodes that are directly connected to a current source may be concurrently stimulated with current at any given time, thereby precluding continuous current stimulation at an array level for multiple electrode cells of the array. Additionally, the inventors have recognized and appreciated that electrical monitoring of the progress of localized reactions at an array level for multiple electrode cells of the array may complement monitoring by optical imaging. In some cases, electrical monitoring may be preferable to optical monitoring by, e.g., avoiding the need for optical equipment, indicator dyes, fluorophores, etc. Additionally, electrical monitoring may enable an electrochemical reaction procedure to be streamlined and automated by, e.g., providing an all-electrical chip-scale interface. Further, the inventors have recognized and appreciated that through use of a measured current to determine a charge flow of an electrochemical reaction, the reaction may be quantified in terms of a number of charged species participating in the reaction.

As noted above, aspects of the present technology are directed to apparatuses and methods for electrically controlling and monitoring local pH. In one aspect, an apparatus according to some embodiments of the disclosed technology may be comprised of a semiconductor substrate that includes an array of pixels. Each pixel may be comprised of CMOS circuitry electrically connected to a plurality of electrodes. The pixels may be produced using standard CMOS-compatible fabrication techniques. The electrodes of the pixels may be located on an outer surface of the semiconductor substrate, such that the electrodes may be exposed to a medium comprised of an electrochemical solution. The inventors have recognized and appreciated that by using known semiconductor processing techniques, the electrodes may be reproducibly fabricated with integrated active circuitry on the semiconductor substrate, which may lead to economical mass-production of arrays of pixels, and also may enable a large array of pixels to be produced (e.g., 30,000 pixels or greater, 90,000 pixels or greater, 100,000 pixels or greater, 120,000 pixels or greater, 130,000 pixels or greater, 140,000 pixels or greater, etc.), with each pixel having electrodes connected to its own integrated active circuitry. Further, using known semiconductor processing techniques for achieving small features (e.g., linewidths) on the micron (μm) scale or smaller, and in some cases on the nanometer (nm) scale, the electrodes of a pixel may be produced to have sizes that are small enough and an electrode-to-electrode pitch that is small enough that the electrodes may have a sufficiently high spatial-resolution to assess molecular structures of specific sizes. For example, when an apparatus of the present technology is used in connection with synthesis of a particular polymer sequence, the apparatus may comprise pixels having dimensions that are appropriate for that particular polymer sequence. Further, according to some aspects of the present technology, the pixels of the array may be addressed individually such that the electrodes of a pixel may be stimulated differently from the electrodes of one or more other pixels, allowing for spatially segmented electrode stimulation and/or spatially segmented reading and/or recording of electrical signals from electrodes of different pixels in real-time using the integrated active circuitry (e.g., the CMOS circuitry) of each of the pixels.

In some aspects of the present technology, an electrochemical apparatus may be provided on a CMOS chip in which an array of electrochemical cells of the apparatus may have each pair of anode and cathode electrodes stimulated concurrently with either a voltage or a current. The chip may be comprised of circuitry that enables the OCV to be measured at each electrode, and also enables the current flow into or out of each electrode to be measured while stimulation is occurring.

FIG. 1 schematically depicts a cross-sectional diagram of an electrochemical apparatus 1, according to some embodiments of the present technology. The apparatus 1 may be comprised of an electrochemical cell 2 that includes a first electrode 2-1, a second electrode 2-2, and a third electrode 2-3 disposed on a surface 3a of a semiconductor substrate 3. In some embodiments, the electrochemical cell 2 may be in an electrochemical reagent solution 4 comprised of species that may participate in an electrochemical reaction, such as a redox reaction. The first electrode 2-1 may be a cathode electrode and may be a location where an electron is donated in a reduction portion of an electrochemical reaction. The second electrode 2-2 may be an anode electrode and may be a location where an electron is consumed or used-up in an oxidation portion of the electrochemical reaction. The third electrode 2-3 may be a sensing electrode and may be used to sense an OCV of the electrochemical reaction. The electrochemical apparatus 1 may be operatively connected to a processing system 6 (e.g., a computer system), which may provide signals (e.g., control signals) to the electrochemical apparatus 1 and receive signals (e.g., detected voltage and/or current signals) from the electrochemical apparatus 1.

According to some embodiments of the present technology, the semiconductor substrate 3 may be comprised of circuitry formed in and/or on the substrate 3. In some embodiments, the circuitry may be comprised of CMOS electronics 5 configured to drive the cathode and anode electrodes 2-1, 2-2 with voltage stimulation or current stimulation, as discussed herein. For example, the CMOS electronics 5 may be comprised of voltage or current sources configured to drive the anode and cathode electrodes 2-2, 2-1 with positive and negative polarities, respectively. In some embodiments, corresponding oxidation and reduction reactions near the electrodes 2-1, 2-2 may be manipulated using an applied voltage or current. Progress of the reactions may be monitored by monitoring an OCV at the sensing electrode 2-3. In some embodiments, the electrodes 2-1, 2-2, 2-3 may be arranged concentrically within a pixel, as discussed below. The pixel may be one of a plurality of pixels of a pixel array, with each pixel of the array having concentrically arranged electrodes forming a reaction site of a microenvironment. For example, the cathode electrode 2-1 may surround and be concentric with the anode electrode 2-2, which in turn may surround and be concentric with the sensing electrode 2-3. With such an arrangement, the cathode electrode 2-1 may form an electrochemical "wall" that effectively prevents diffusion of protons ($H^+$) generated at the anode electrode 2-2; thus the cathode electrodes 2-1 of the pixels may enable localized control of individual reaction sites corresponding to the pixels. The OCV of the pixel, which may be measured by the pixel's sensing electrode 2-3, may be proportional to the concentration of protons, i.e., the pH, of the microenvironment within pixel.

Referring back to FIG. 1, the CMOS electronics 5 may be comprised of active circuitry formed in or on the semiconductor substrate 3. The CMOS electronics 5 of a pixel may include one or more stimulus source circuits 5a, 5b and one or more recording/sensing circuits 5c. According to some embodiments of the present technology, the one or more of the stimulus source circuits may be comprised of one or more current sources (e.g., current injectors) or one or more voltage sources, or a combination thereof. In some embodiments, the cathode electrode 2-1 may be connected to a negative voltage source or a current sink 5a, the anode electrode 2-2 may be connected to a positive voltage source or a current source 5b, and the sensing electrode 2-3 may be connected to OCV measurement circuitry 5c.

According to some embodiments of the present technology, the electrodes 2-1, 2-2, 2-3 of the electrochemical cell 2 may be reconfigured using the CMOS electronics 5. In some embodiments, CMOS electronics 5 may be comprised of routing and switching components that may be programmed to connect a selected electrode of the electrochemical cell 2 to a stimulus source circuit, or to a recording/sensing circuit (e.g., to measure a voltage or a current), or to other circuit components to enable different functionalities. In some embodiments, the CMOS electronics 5 may provide signals to and receive signals from the processing system 6, as noted above. For example, the processing system 6 may receive a signal corresponding to an OCV detected by the sensing electrode 2-3 and may provide control signals to control a stimulus current and/or a stimulus voltage provided to the anode and cathode electrodes 2-2, 2-1. In some embodiments, the processing system 6 may be used to pre-program configuration bits in each pixel's memory, to enable an electrochemical process to run automatically based on the configuration bits. In some embodiments, the configuration bits stored by a pixel may be different from the configuration bits stored by another pixel, such that the pixel is stimulated differently from the other pixel. In some embodiments, a group of pixels may each store the same configuration bits, such that all the pixels of the group are stimulated in the same way or nearly the same way.

Figure 2:
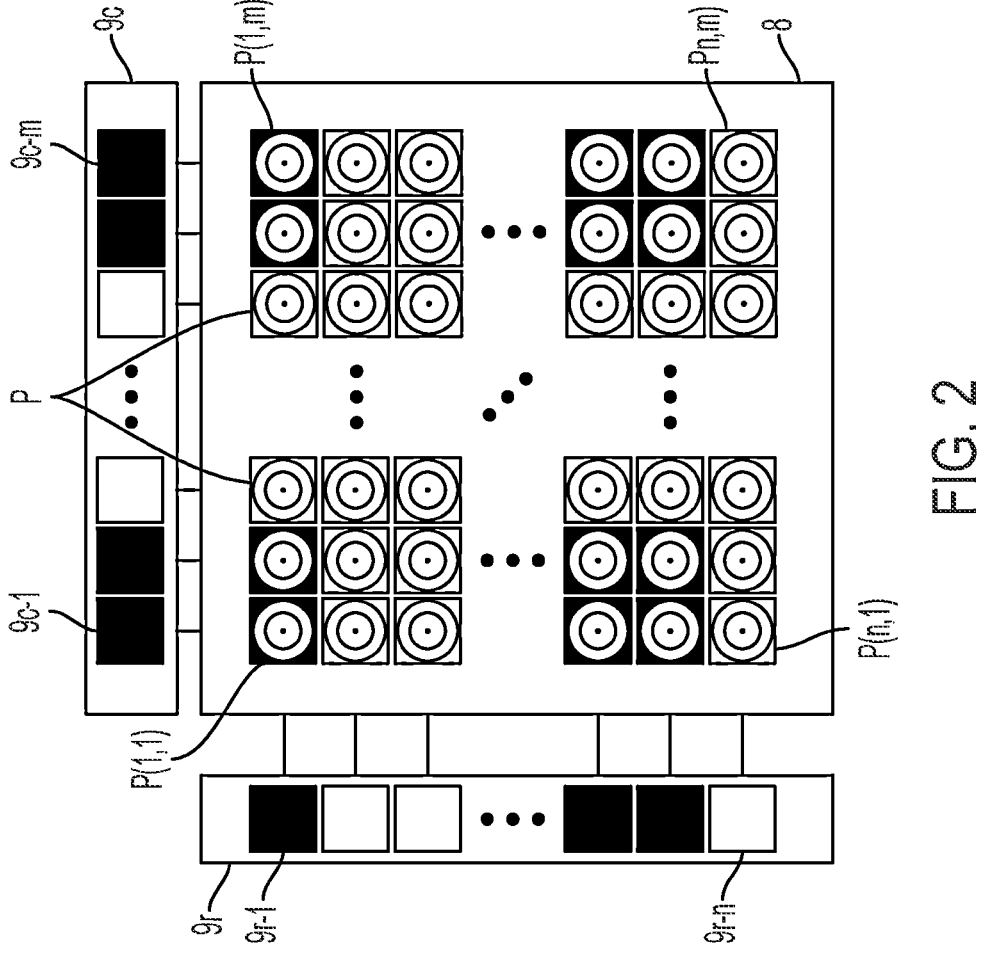
FIG. 2 schematically depicts an array of electrochemical cells for producing an array of microenvironments and circuitry for selectively addressing one or more of the electrochemical cells, according to some embodiments of the disclosed technology.

According to some embodiments of the present technology, the electrodes 2-1, 2-2, 2-3 of the electrochemical cell 2 for each pixel of a plurality of pixels may be controlled individually by the CMOS electronics 5 of each of the pixels as well as CMOS electronics 5 shared by the pixels. FIG. 2 schematically shows a pixel array 8 comprised of a plurality of pixels P arranged in n rows and m columns. For example, each pixel P may be identified by its row and column as P(r,c), where r and c identify the row and the column, respectively, of the pixel. The CMOS electronics 5 may be comprised of a first bank 9r of row shift registers 9r-1, . . . , 9r-n and a second bank 9c of column shift registers 9c-1, . . . , 9c-m. In some embodiments, each pixel P of the array 8 may be addressed and/or controlled individually by appropriate selection of one of the row shift registers 9r-1, . . . , 9r-n and one of the column shift registers 9c-1, . . . , 9c-m. As schematically shown in FIG. 2, the first bank 9r of shift registers 9r-1, . . . , 9r-n may be aligned with rows of the pixel array 8, and the second bank 9c of shift registers 9c-1, . . . , 9c-m may be aligned with columns of the pixel array 8. As described below, each pixel P may be comprised of memory configured to store an electrochemical configuration for the pixel P. The electrochemical configuration may include a magnitude, a direction, and a stimulation type (e.g., voltage or current) for a desired reaction. In some embodiments, the processing system 6 may be used to perform random-access programming of a desired group of one or more of the pixels P of the array 8, by addressing the memories of the pixels P of the group to store an electrochemical configuration for a desired reaction.

In some embodiments, the processing system 6 may control the CMOS electronics 5 to cause the anode and cathode electrodes 2-2, 2-1 of a pixel to switch roles (e.g., the electrode 2-2 may be caused to be a cathode electrode, and the electrode 2-1 may be caused to be an anode electrode). In some embodiments, the CMOS electronics 5 may be controlled to stimulate the anode and cathode electrodes 2-2, 2-1 of the pixel and to simultaneously detect an OCV using the sensing electrode 2-3 and thus monitor progress of an electrochemical reaction in a microenvironment of the pixel. In some embodiments, a group of one or more pixels of an array of pixels may be controlled to perform one type of electrochemical reaction while another group of one or more pixels of the array may be controlled to perform another type of electrochemical reaction simultaneously.

According to some embodiments of the present technology, the semiconductor substrate 3 may be comprised of Si. In such embodiments, the CMOS electronics 5 may be comprised of an integrated circuit fabricated using standard CMOS processing techniques. The electrochemical cell 2 may be disposed within the semiconductor substrate 3 (e.g., as conductors exposed to the electrochemical solution 4 at the surface 3a of the semiconductor substrate 3). In some embodiments, the surface 3a may be an insulative surface that provides mechanical support and electrical isolation to the electrochemical cell 2 while also providing a suitable surface for electrochemical reactions (e.g., chemical synthesis reactions). Although FIG. 1 may show that the electrochemical cell 2 is partially embedded in the semiconductor substrate 3, such an arrangement is an illustrative example only and not a requirement. In some embodiments, top surfaces of electrodes 2-1, 2-2, 2-3 in electrochemical cell 2 may be above, aligned vertically with, or below the surface 3a of the semiconductor substrate 3. Additionally or alternatively, the top surfaces of the electrodes 2-1, 2-2, 2-3 may have a passivation layer or functionalization layer. In some embodiments, holes may be patterned in the passivation or functionalization layer on top of the electrodes to expose conductive surfaces of the electrodes to the solution 4.

The semiconductor substrate 3 is not limited to being a Si-based substrate and may be any substrate fabricated using know semiconductor processing techniques. For example, the semiconductor substrate 3 may be comprised of a group IV semiconductor, a III-V semiconductor, a II-V semiconductor, a $sp^2$ hybridized carbon material, a chalcogenide, a metal, a metallic compound, an oxide, a nitride, a silicide, a polymer material, or combinations thereof. The semiconductor substrate 3 may be comprised of a unitary component or may be comprised of a composite of multiple components. Components in the semiconductor substrate 3 may include, e.g., one or more active circuit layers, one or more wiring layers, one or more redistribution layers, a circuit board, or combinations thereof. Components in the semiconductor substrate 3 may be formed during or in addition to CMOS processing, or be formed separately and bonded together using, e.g., packaging techniques known in the field of semiconductor processing. Conductors may be provided in the semiconductor substrate 3 and patterned to interconnect the active circuitry 5 with the electrodes 2-1, 2-2, 2-3 of the electrochemical cell 2.

According to some embodiments of the disclosed technology, connection points may be provided on the semiconductor substrate 3 (e.g., at a bottom surface of the semiconductor substrate 3) for electrically interfacing components within the semiconductor substrate 3 with the processing system 6. Electrical connection between the processing system 6 and the semiconductor substrate 3 may be provided via any suitable means (e.g., known chip-connection techniques, wire bonding, printed-circuit-board connectors, flexible cables, wireless communication, etc.).

In some embodiments of the present technology, operation of the electrochemical apparatus 1 may be automated (e.g., under control of the processing system 6). Referring back to FIG. 1, the processing system 6 of the apparatus 1 may, in some embodiments, include a computer 6a comprised of a storage medium/media 6b, memory 6c, and a processor 6d. The storage medium/media 6b and the memory 6c may include any suitable non-transitory computer-readable medium, non-limiting examples of which include a computer hard-disk and/or solid-state memory, compact disc(s), optical disc(s), magnetic tape(s), flash memory device(s), circuit configurations in Field Programmable Gate Arrays (FPGAs) or other semiconductor devices, as well as other tangible structures for storing computer-readable code. In some embodiments, the storage medium/media 6b may be comprised of a non-volatile storage, and the memory 6c may be comprised of a volatile storage. In some embodiments, computer-executable instructions may be loaded from the storage medium/media 6b to the memory 6c before execution by the processor 6d to perform some or all steps or acts of various methods of, e.g., steps or acts to control a polymer synthesis reaction via a detected local pH for the reaction. However, as will be appreciated, a distinction between the storage medium/media 6b and the memory 6c is not critical and either or both may be present in some embodiments.

The processor 6c may be any suitable processing device, non-limiting examples of which include: a central processing unit (CPU), a digital signal processor (DSP), a controller, an addressable controller, a general microprocessor, a special purpose microprocessor, a microcontroller, an addressable microprocessor, a programmable processor, a programmable controller, a dedicated processor, a dedicated controller, any other suitable processing device. As will be appreciated, the processor 6d may be comprised of a combination of these devices and/or multiple units of one of these devices. Some or all components within the processing system 6 may be packaged as a system-on-a-chip (SOC). Moreover, it should be appreciated that FIG. 1 shows a schematic representation of the processing system 6. In some embodiments of the present technology, the processing system 6 may be comprised of units for performing distributed processing. Although not specifically shown in FIG. 1, a host computer may control an overall flow of a synthesis method, including mapping of OCV measurements over time from electrodes, analysis of results, etc.

Turning now to the electrochemical cell 2. In some embodiments of the present technology, the electrochemical cell 2 may be patterned on the surface 3a as part of a semiconductor fabrication process to form the CMOS electronics 5 of the semiconductor substrate 3. The electrodes 2-1, 2-2, 2-3 of the electrochemical cell 2 may be comprised of conductive structures (e.g., pads, shaped structures, annular structures, etc.) that may be formed of a metal (e.g., Au, Pt, Au—Pt alloys, etc.). In some embodiments, the electrodes 2-1, 2-2, 2-3 of the electrochemical cell 2 may be comprised of an inert material that is non-reactive with the electrochemical solution 4. For example, the conductive structures may be formed of Al with plated Au as a top layer exposed to the solution 4. In such embodiments, the semiconductor substrate 3 may be comprised of conductors that interconnect the exposed electrodes of the electrochemical cell 2 to circuitry and other electrical components within the substrate 3.

The semiconductor substrate 3 may be comprised of a plurality of pixels of a pixel array, with each pixel being comprised of its own electrochemical cell 2. The electrochemical cells 2 of the pixels may be arranged on the surface 3a in any suitable arrangement. For example, in some embodiments of the present technology, the electrochemical cells 2 may be arranged in a two-dimensional grid array with rows arranged at a first pitch and columns arranged at a second pitch, which may be the same as or different from the first pitch.

In some embodiments of the present technology, the electrochemical cells 2 and the CMOS electronics 5 may be fabricated during a CMOS-compatible fabrication process such that the electrochemical cells 2 are above the corresponding pixel circuits of the CMOS electronics 5, as discussed below.

According to some embodiments of the disclosed technology, the apparatus 1 may be used to enable spatially positioned electrochemical reactions by selectively addressing certain portions of the pixel array. For example, a group of electrodes in the pixel array may be selected to receive one or more potentials applied by the corresponding CMOS electronics 5 in the semiconductor substrate 3. The potential(s) may be chosen to initiate an electrochemical reaction in regions of the solution 4 directly above the selected electrodes, or to investigate whether an electrochemical reaction may be initiated. As will be appreciated, electrochemistry can be performed selectively at a pre-designed spatial pattern, based on the size, shape, and distribution of selected electrodes of the electrochemical cell 2 on the surface 3a of the semiconductor substrate 3, via selectively addressing electrodes of the pixel array using the CMOS electronics 5. The pre-designed spatial pattern may, in some embodiments, be programmed via the processing system 6, as noted above.

Figure 3:
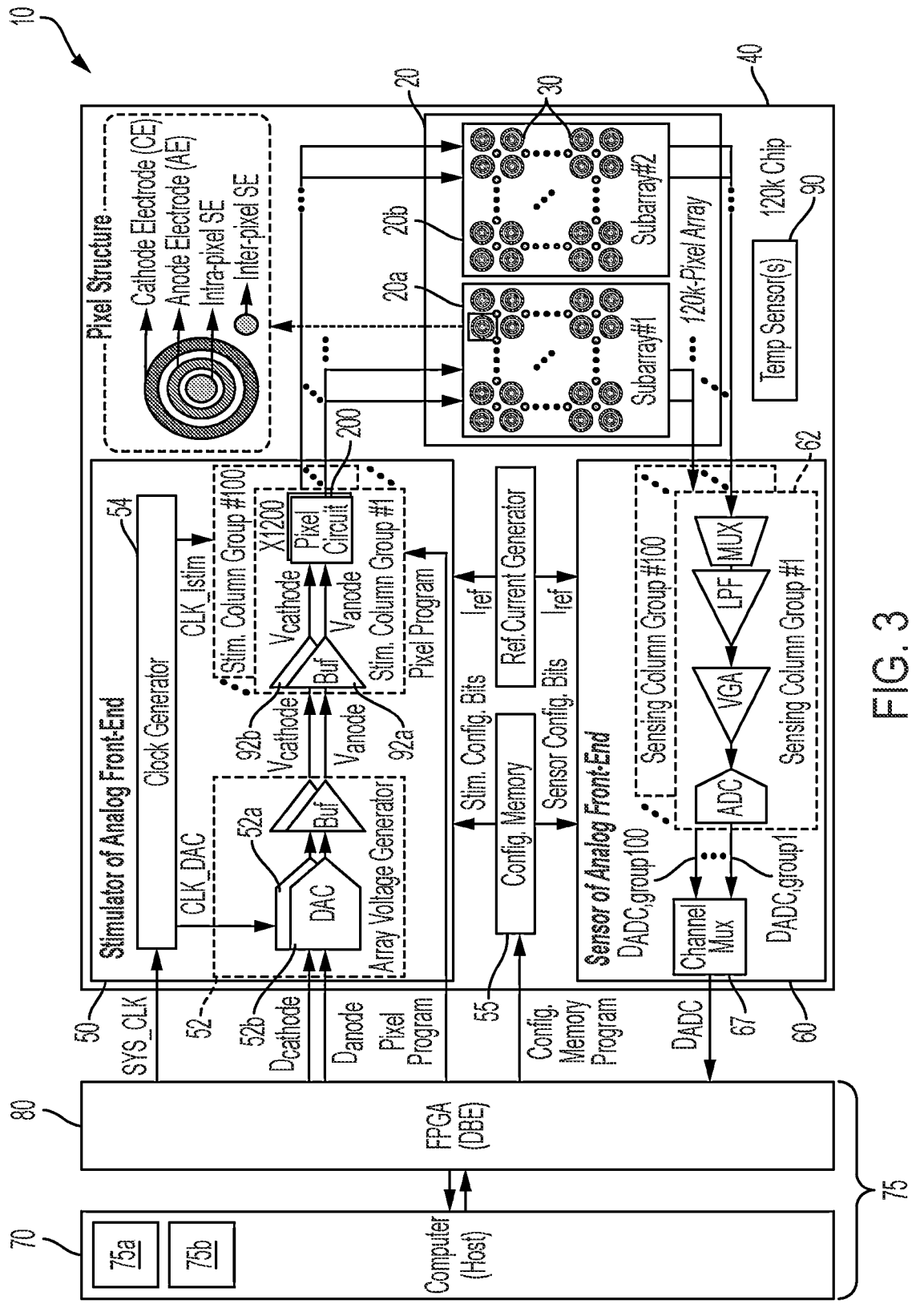
FIG. 3 schematically depicts an electrochemical apparatus, according to some embodiments of the present technology.

FIG. 3 schematically depicts an electrochemical apparatus 10, according to various embodiments of the present technology. The apparatus 10 may be comprised of an array 20 of pixels 30 disposed on a chip 40, stimulator circuitry 50 disposed on the chip, and sensor circuitry 60 disposed on the chip. The stimulator circuitry 50 may be configured to provide electrical input signals (e.g., a current or a voltage) to cause stimulation of the pixels 30 of the array 20. In some embodiments, the stimulator circuitry 50 may be configured to provide the input signals to cause stimulation of the pixels 30 individually. In some embodiments, the individual stimulation of the pixels 30 may be performed simultaneously. The sensor circuitry 60 may be configured to read electrical output signals from the pixels 30 of the array 20. In some embodiments, the sensor circuitry 60 may be configured to selectively read the output signals from the pixels 30 while the pixels 30 are being stimulated. In some embodiments, a group of the pixels 30 may be selected and addressed individually via circuitry respectively provided for each of the pixels 30 of the group. As described in more detail below, electrodes of the pixels 30 of the group may be stimulated with either a voltage or a current using shared voltages and clock signals. In some embodiments, the sensor circuitry 60 may be configured to read an OCV and also a current flow at each electrode of the selected pixel(s) in a time-division multiplexed manner during stimulation of the selected pixel(s).

Although not specifically shown in the drawings, a total number of pixels 30 in the array 20 may range from less than 10 to over 1,000,000. In some embodiments of the present technology, the total number of pixels 30 in the array 20 may be in a range of 10,000 pixels to 120,000 pixels. In some embodiments of the present technology, the total number of pixels 30 in the array 20 may be in a range of 30,000 pixels to 120,000 pixels. In some embodiments, the array 20 may be comprised of 120,000 pixels. In some embodiments, the array 20 may be comprised of $2^{17}$ pixels, or 130,000 pixels or greater, or 140,000 pixels or greater. In some embodiments, the total number of pixels 30 in the array 20 may be in a range of 120,000 pixels to 1,000,000 pixels. In some embodiments, the array 20 may be comprised of at least two subarrays 20a, 20b, with the subarrays 20a, 20b being located adjacent each other on the chip 40 or separated from each by a space and/or by one or more other component(s) of the chip 40.

According to some embodiments of the present technology, the array 20 of pixels 30 may be comprised of pixel groups. Each pixel group may be comprised of pixels 30 arranged in one column or a plurality of columns. In some embodiments, each pixel group may be comprised for four columns of pixels 30. The stimulator circuitry 50 may be comprised of an array voltage generator 52, which may be a global voltage generator configured to provide stimulation voltages to the column(s) of pixels 30 of the pixel groups of the array 20. The sensor circuitry 60 may be comprised of sensing channels 62, with each sensing channel 62 being comprised of circuitry configured to read the output signals of the pixels 30 of a corresponding column of the pixel groups. The sensing channels 62 also may be referred to as readout channels 62 herein.

In one example embodiment, the array 20 may be comprised of 100 pixel groups each containing 1200 pixels 30 for a total of 120,000 pixels 30. Each pixel group may be comprised of two columns of pixels 30, with each column containing 600 pixels 30. As will be appreciated, in other embodiments the number of columns may be different from two, the number of pixel groups may be different from 100, etc.

Figures 4, 5:
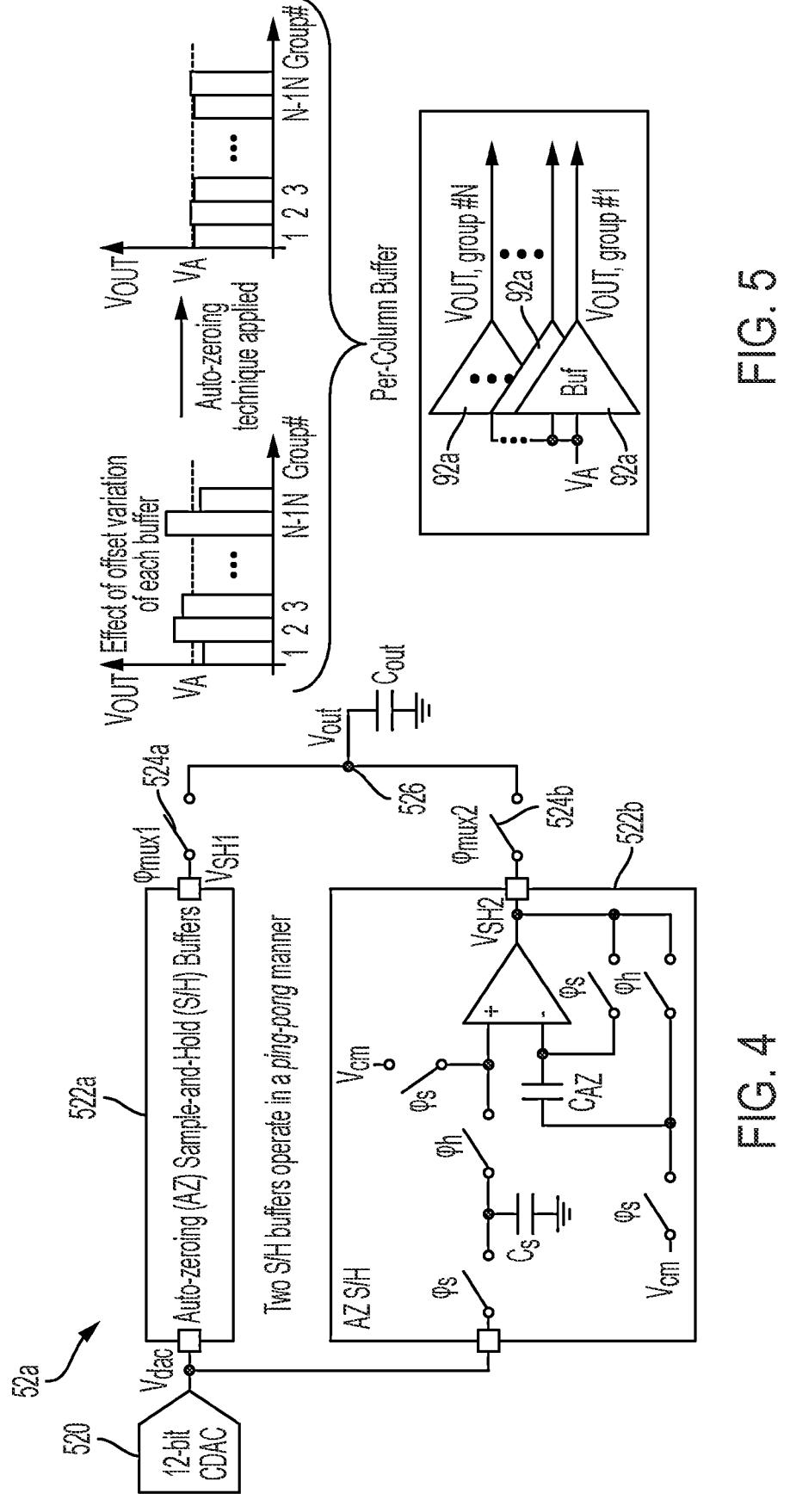
FIG. 4 shows a schematic diagram of a generator portion of an array voltage generator according to some embodiments of the present technology.
FIG. 5 schematically shows an auto-zeroing scenario, according to some embodiments of the present technology.

In some embodiments of the present technology, the array voltage generator 52 may be comprised of a first generator portion 52a and a second generator portion 52b, as schematically shown in FIG. 3. FIG. 4 shows a schematic diagram of the first generator portion 52a. As will be appreciated, the first and second generator portions 52a, 52b may be functionally and/or structurally identical to each other and therefore the diagram of FIG. 4 may also represent the second generator portion 52b. Each of the first and second generator portions 52a, 52b may be comprised of a DAC 520, primary and secondary buffers 522a, 522b, and primary and secondary output switches 524a, 524b. The DAC 520 may be configured to receive a digital input signal and to provide an analog output signal to the primary and secondary buffers 522a, 522b. For example, the input signal may be an input stimulation voltage for stimulating an anode electrode or a cathode electrode of the pixels 30 in the column(s) of the pixel groups, and the output signal may be the stimulation voltage converted to analog form. The DAC 520 may be comprised of a plurality of resistors or may be a capacitive DAC (CDAC) (e.g., a split-capacitor DAC). In some embodiments, the DAC 520 may be a 12-bit CDAC.

In some embodiments of the present technology, the primary and secondary buffers 522a, 522b of each of the first and second generator portions 52a, 52b may be configured to receive the analog signal output from the DAC 520 and to hold the analog signal. In some embodiments, each of the primary and secondary buffers 522a, 522b, which may be identical to each other, may be a sample-and-hold buffer configured to perform an auto-zeroing process to ensure that an analog output signal from the buffer has an offset variation that is less than a predetermined amount from a desired analog output signal. For example, the secondary buffer 522b may receive an analog stimulation voltage from the DAC 520 and may perform the auto-zeroing process on the analog stimulation voltage to correct or auto-zero an offset of the analog stimulation voltage to within, e.g., 0.1 mV of a desired stimulation voltage.

With respect to the need for auto-zeroing, processing variations during fabrication of the chip 40 may result in dimensional variations from ideal dimensions for the chip 40. Such variations may result in differences from pixel to pixel, which can lead to performance variations for the electrochemical reactions and consequently a reduced reliability of assessment results from the electrochemical reactions. As will be appreciated, for an array with a large number of pixels (e.g., 120,000 or more), physical variations may occur from region to region as well as from pixel to pixel, which can call into question whether differences measured from region to region (e.g., from column to column; between pixels on the left of the array and pixels on the right of the array; etc.) and from pixel to pixel are caused by physical differences in the pixels themselves or from differences in the electrochemical reactions. Additionally, any post-fabrication processing of the array 20 may contribute to variations, as such processing may alter surface characteristics of electrode surfaces on which the electrochemical reactions occur. In some embodiments of the present technology, variations that may affect readout of signals from the pixels 30 may be compensated for via signal-processing techniques (e.g., offset cancellation, correlated double sampling, etc.) Stimulation variations, however, need to be minimized or eliminated before the stimulation (voltage or current) is applied to the stimulation electrodes 110, 120 of the pixels 30.

As discussed herein, the array voltage generator 52 may provide a voltage that is shared by a plurality of different groups of the pixels 30. In some embodiments of present technology, the groups may be columns of the array 20, and the shared voltage may be distributed to each of the columns through buffers 92a, 92b, as schematically shown in FIG. 3. Each of the buffers 92a, 92b may perform an auto-zeroing technique to minimize or eliminate variations in the shared voltage before the shared voltage reaches the pixel circuits 200 of the column. In some embodiments, a first buffer 92a may be used to perform an auto-zero process on the shared voltage for the first stimulation electrodes 110 of the column, and a second buffer 92b may be used to perform the auto-zero process on the shared voltage for the second stimulation electrodes 120 of the column. In some embodiments, each of the buffers 92a, 92b may be functionally and/or structurally the same and may be configured to minimize or eliminate an offset for the column. FIG. 5 schematically shows an auto-zeroing scenario for a plurality of first buffers 92a corresponding to a plurality of columns of the array 20. In this scenario, a shared voltage $V_A$ is provided to the first buffers 92a. In the absence of offset-elimination, the output voltage $V_{OUT}$ from the different ones of the first buffers 92a may vary significantly, as schematically shown by the graph on the top left of FIG. 5. In some cases, without offset-elimination, the variation may raise questions about the reliability of assessments made from electrochemical reactions using the array 20. With offset-elimination, however, the output voltage $V_{OUT}$ from the different ones of the first buffers 92a may have little variation, as schematically shown by the graph on the top right of FIG. 5, and the reduced variation may enable an increased confidence in assessments made from electrochemical reactions using the array 20.

In some embodiments of the present technology, the array voltage generator 52 may provide a plurality of shared voltages from which a voltage to be used for stimulation may be selected. For example, each pixel 30 may be provided with input signals corresponding to multiple shared voltages, and may be configured to independently select one of shared voltages for use by its pixel circuit 200. As discussed below, each pixel may be comprised of an in-pixel memory 56 that stores configuration bits, which may be used for selecting one of the shared voltages to be applied to its pixel circuit 200. In some embodiments, for current stimulation, because the sensor circuitry 60 enables current flow to be measured at each electrode of a pixel 30, a pixel-to-pixel variation may be reduced by setting the configuration bits of the pixels 30 so that pixel-to-pixel variation of the stimulation current is minimized or within a predetermined limit (e.g., within one standard deviation) through appropriate selection of one of the shared voltages. In some embodiments, the setting of the configuration bits may be automated (e.g., through automatic updates), and therefore aspects of the auto-zeroing process may be automated. As noted above, an electrochemical reaction may be automated via the configuration bits of each of the pixels 30, by addressing the memories 56 of the pixels 30 individually (e.g., via random-access programming using the banks of shift registers 9r, 9c).

In some embodiments of the present technology, primary and secondary output switches 524a, 524b of each of the first and second generator portions 52a, 52b may be configured to selectively connect the primary buffer 522a or the secondary buffer 522b to an output 526 of the generator portion 52a, 52b. For example, a signal provided to the primary switch 524a may cause the primary switch 524a to close to enable the auto-zeroed analog signal held in the primary buffer 522a to be output from the first generator portion 52a via the output 526.

In some embodiments of the disclosed technology, the stimulator circuitry 50 and the sensor circuitry 60 may be coupled to a configuration memory 55. The configuration memory 55 may be configured to provide stimulator configuration bits to the stimulator circuitry 50, and to provide sensor configuration bits to the sensor circuitry 60. The configuration memory may be disposed on the chip 40, as shown in FIG. 3, of may be located off-chip but in communication with the stimulator circuitry 50 and the sensor circuitry 60.

In some embodiments of the present technology, the stimulator circuitry 50 and the sensor circuitry 60 may be coupled to a current generator configured to provide reference currents to the stimulator circuitry 50 and the sensor circuitry 60 The current generator may be disposed on the chip 40, as shown in FIG. 3, of may be located off-chip but in communication with the stimulator circuitry 50 and the sensor circuitry 60.

According to some embodiments of the present technology, the first and second generator portions 52a, 52b of the array voltage generator 52 may output an anode signal and a cathode signal, respectively, to a plurality of pixel-group stimulators of the stimulator circuitry 50. Each pixel-group stimulator may be configured to a corresponding one of the pixels groups.

For example, returning to the example embodiment discussed above, the stimulator circuitry 50 may be comprised of 100 pixel-group stimulators for the 100 pixel groups. Each pixel-group stimulator may be comprised of an anode buffer 92a, a cathode buffer 92b, and a plurality of pixel circuits 200 corresponding to the pixels 30 of the pixel group. The anode buffer 92a and the cathode buffer 92b may be configured to receive an anode signal and a cathode signal, respectively, from the array voltage generator 52. An auto-zeroed anode voltage may be output from the first generator portion 52a to the buffer 92a of each of the pixel-group stimulators, and an auto-zeroed cathode voltage may be output from the second generator portion 52b to the buffer 92b of each of the pixel-group stimulators. For each pixel-group stimulator, the anode buffer 92a and the cathode buffer 92b may be configured to provide the anode signal and the cathode signal, respectively, to the pixel circuits 200 of the pixels 30 the columns of pixels 30 of the corresponding pixel group. Each pixel circuit 200 may selectively provide an anode stimulation signal or a cathode stimulation signal to a corresponding pixel 30 of the pixel group based on information stored in the configuration memory and provided to the pixel circuits 200.

According to some embodiments of the disclosed technology, the electrochemical apparatus 10 may be comprised of a controller 75 operatively connected to the stimulator circuitry 50 and the sensor circuitry 60, as depicted in FIG. 3. The controller 75 may be configured to provide stimulation control signals to the stimulator circuitry 50 to control the stimulator circuitry 50 to stimulate the pixels 30 of the array 20. The controller 75 also may be configured to provide sensor control signals to the sensor circuitry 60 to selectively route the output signals from the pixels 30 to the sensing channels 62 of the sensor circuitry 60.

In some embodiments of the present technology, the controller 75 may be comprised of a microprocessor 75a (e.g., a CPU) operatively coupled to a storage device 75b (e.g., a hard disk, a solid-state memory device, etc.) storing computer-readable code. The microprocessor 75a may be configured to execute the computer-readable code to perform a control one or more operations or procedures of the apparatus 10. For example, the microprocessor 75a may execute the computer-readable code to control an electrochemical stimulation procedure of the stimulator circuitry 50 to stimulate the pixels 30, and/or to control a recording procedure of the sensor circuitry 60 to record measurement data obtained from the pixels 30, and/or to control a display device (not shown) to display a user interface to enable a user to input parameters for controlling the apparatus 10

(e.g., to control the electrochemical stimulation procedure, to control the recording procedure, etc.). In some embodiments, the user interface may enable a user to input configuration parameters for configuring the electrochemical apparatus. As depicted in FIG. 3, the microprocessor 75a and the storage device 75b may be part of a host computer 70 of the controller 75.

In some embodiments of the present technology, the controller 75 may be comprised of a FPGA 80 operative coupled to the microprocessor 75a and the stimulator circuitry 50. In some embodiments, the FPGA 80 may be configured to receive input parameters from the microprocessor 75a (e.g., the parameters inputted by the user) and to output control signals to the stimulator circuitry 50 based on the input parameters. In some embodiments, the FPGA 80 may be operatively connected to a clock generator 54 of the stimulator circuitry 50 to provide a clock signal for controlling the clock generator 54.

In some embodiments of the present technology, the FPGA 80 may be operatively connected to the sensor circuitry 60 to receive and record measurement data from the sensor circuitry 60. The FPGA 80 may be configured to aggregate the measurement data before the measurement data is recorded.

In some embodiments of the present technology, the FPGA 80 may be operatively connected to the configuration memory 55 to program the configuration memory 55.

According to some embodiments of the present technology, the electrochemical apparatus 10 may be comprised of at least one temperature sensor 90 disposed on the chip 40 and configured to measure a temperature of a reaction surface of the array 20. For example, if the array 20 is comprised of the two subarrays 20a, 20b then two temperature sensors 90 may be disposed on the chip 40 so that each subarray 20a, 20b may have its surface temperature monitored by its own temperature sensor 90. In some embodiments, each temperature sensor 90 may be comprised of at least one temperature-to-frequency converter circuit configured to output a digital temperature signal representing the measured temperature. The digital temperature signal may be provided to the sensor circuitry 60, which may in turn may provide the digital temperature signal to the FPGA 80, or the digital temperature signal may be provided directly from each temperature sensor 90 to the FPGA 80.

Figure 6:
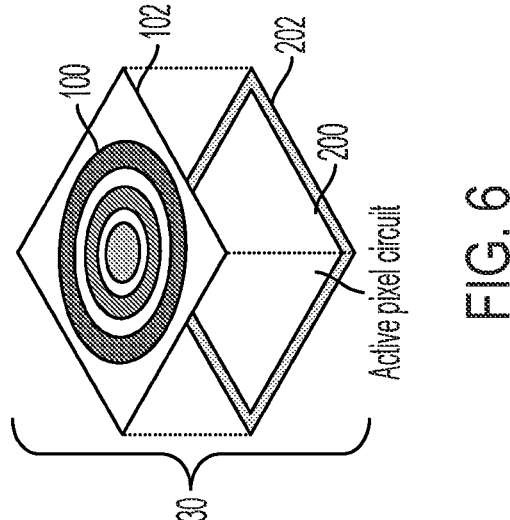
FIG. 6 schematically depicts a top perspective view of a pixel, according to some embodiments of the present technology.
Figure 7:
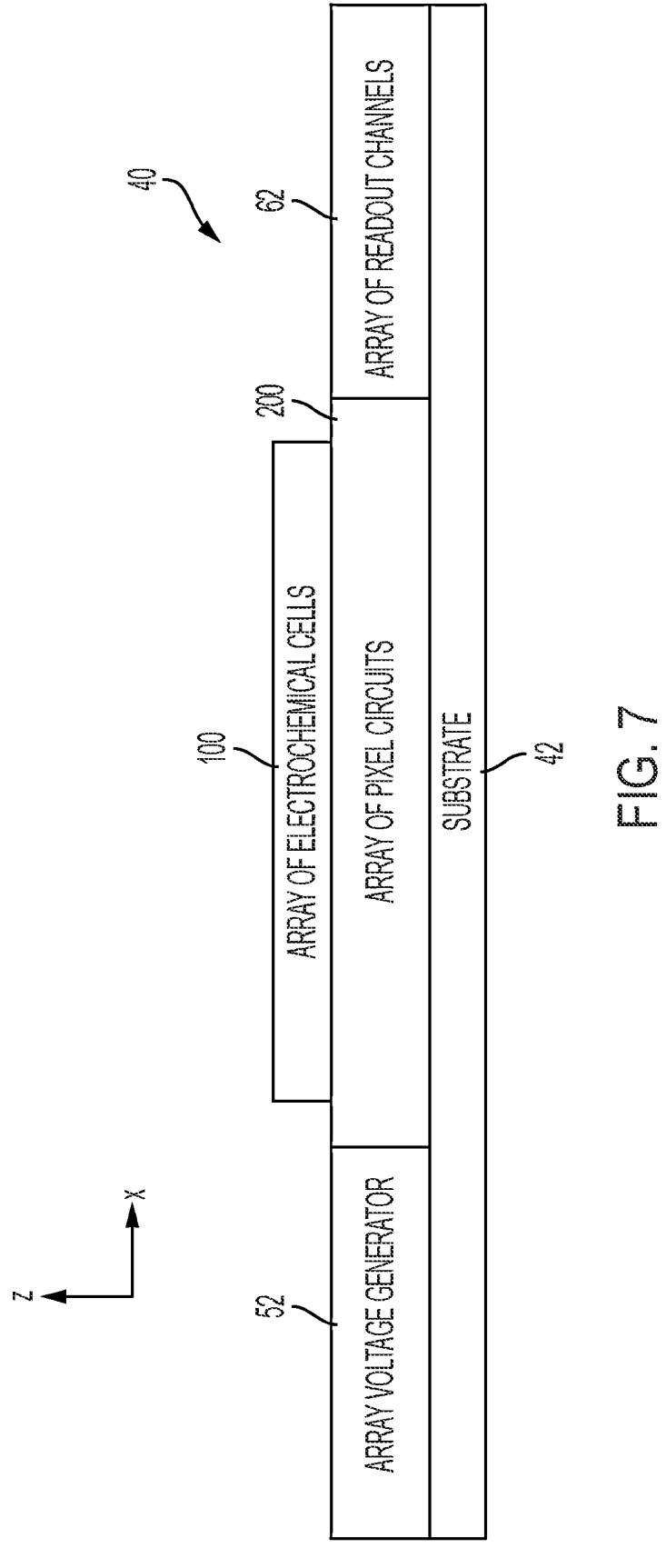
FIG. 7 schematically depicts a cross-sectional view of a chip comprised of an array of pixels and circuitry for stimulating the pixels and reading signals from the pixels, according to some embodiments of the present technology.

FIG. 6 schematically depicts a structure of each pixel 30 of the array 20, according to some embodiments of the present technology. Each pixel 30 may be comprised of an electrochemical cell 100 overlaying and operatively connected to one of the pixel circuits 200 corresponding to the electrochemical cell 100. In some embodiments, the electrochemical cells 100 may be arranged in first array, and the pixel circuits 200 may be arranged in second array located under the first array in a stacked structure, with each electrochemical cell 100 of the first array operatively connected to a corresponding one of the pixel circuits 200 of the second array, as schematically depicted in FIG. 7, which shows a cross-sectional view of a portion of the chip 40. The stacked structure formed of the first and second arrays may, in some embodiments, form the array 20 of pixels 30. In some embodiments, the stacked structure may be supported by a substrate 42 of the chip 40. In some embodiments, the readout channels 62 of the sensor circuitry 60 may be arranged as an array located on one side of the stacked structure, and the array voltage generator 52 of the stimulator circuitry 52 may be located on another side of the stacked structure. As will be appreciated, although the pixel circuits 200 are schematically depicted in FIG. 3 to be located at a separate region of the chip 40, from the array 20 of pixels 30, the schematic depiction in FIG. 3 is merely to facilitate an understanding of the functions of the different components of the electrochemical apparatus 10 and should not be interpreted to limit the scope of the disclosure or the scope of the claims. Also, as will be appreciated, the stacked structure need not be sandwiched between the readout channels 62 and the array voltage generator 52, as depicted in FIG. 7.

Figure 8:
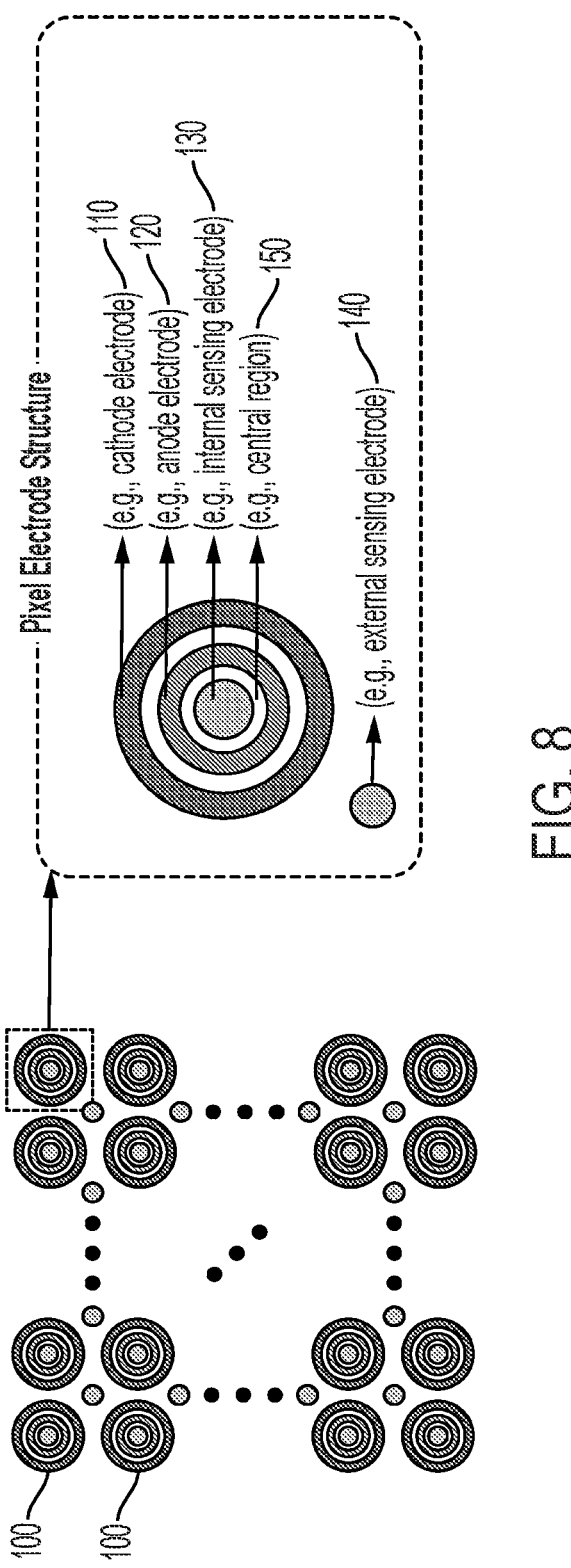
FIG. 8 schematically depicts a top plan view showing an arrangement of electrodes of an array of pixels, according to some embodiments of the present technology.

According to some embodiments of the present technology, each electrochemical cell 100 may be comprised of a plurality of electrodes 110, 120, 130, 140. FIG. 8 schematically depicts a top plan view of a section of the array 20 showing an arrangement of the electrodes 110, 120, 130, 140 of the electrochemical cells 100 of the section. The electrodes 110, 120, 130, 140 may be located on an electrode level 102 of the chip 40. In some embodiments, the electrode level 102 of the chip 40 may be an outer surface of the chip 40, thus enabling the electrodes 110, 120, 130, 140 to be exposed to a solution or medium (e.g., the electrochemical solution 4 discussed above). The pixel circuits 200 may be arranged on a pixel-circuitry level 202 of the chip 40 between the electrode level 102 and the substrate 42 of the chip 40.

According to some embodiments of the present technology, the electrodes 110, 120, 130, 140 of each electrochemical cell 100 may be comprised of first and second stimulation electrodes 110, 120 and first and second sensing electrodes 130, 140. In some embodiments, the first electrode 110 may be a cathode electrode 110 and the second electrode 120 may be an anode electrode. In some other embodiments, the first electrode 110 may be an anode electrode 110 and the second electrode 120 may be a cathode electrode.

According to some embodiments of the present technology, the first and second stimulation electrodes 110, 120 of each pixel 30 may be structured as concentric rings that may have a common region 150. The first sensing electrode 130 may be located within the common region 150, and the second sensing electrode 140 may be located outside of the common region 150 and outside of the concentric rings, as schematically shown in FIG. 8. In some embodiments, the first and second stimulation electrodes 110, 120 may be connected to the stimulator circuitry 50 (e.g., via the pixel circuit 200 of the pixel 30), and the first and second sensing electrodes 130, 140 may be connected to the sensor circuitry 60 (e.g., via a corresponding one of the sensing channels 62). In some embodiments, each pixel circuit 200 may include circuitry that enables the first and second stimulation electrodes 110, 120 to be connected to the sensor circuitry 60, as discussed below.

In some embodiments of the present technology, the first and second stimulation electrodes 110, 120 may be a cathode electrode 110 and an anode electrode 120, which may be used to manipulate localization of electrochemical reagents. For example, the cathode electrode 110 and anode electrode 120 may be used to obtain a desired reaction rate by controlling an anodic or cathodic voltage or current. As discussed herein, the arrangement of anodic and cathodic positions shown in FIG. 8 may be swapped (i.e., the inner electrode may be the cathode and outer electrode may be the anode electrodes) in each pixel 30 through use of the pixel circuit 200 in each pixel 30. In some embodiments, an OCV of a pixel 30 may be measured between the first sensing electrode 130 of the pixel 30 (i.e., the electrode located internally within the rings of the cathode electrode 110 and the anode electrode 120) and the second sensing electrode

140 of the pixel 30 (i.e., the electrode located outside of the rings of the cathode electrode 110 and the anode electrode 120). By measuring the OCV of a pixel 30 during an electrochemical reaction, a progress of the electrochemical reaction may be monitored in real time while stimulation of the pixel 30 is occurring. In some embodiments, the OCVs for each pixel 30 of a group of pixels 30 or even of the entire array 20 may be monitored in real time during an electrochemical reaction (e.g., before, during, and after stimulation of the pixels 30).

As noted above, the array 20 may be comprised of pixel groups. In some embodiments of the present technology, the array voltage generator 52 may be operatively connected to the pixel groups to provide an anode voltage and a cathode voltage to a selected pixel group via the pixel circuits 200 of the selected pixel group. For example, each of the pixel circuits 200 of the selected pixel group may selectively provide a cathode stimulation current to the first stimulation electrode, or a cathode stimulation voltage to the first stimulation electrode, or an anode stimulation current to the second stimulation electrode, or an anode stimulation voltage to the second stimulation electrode. That is, as noted above, the stimulation electrodes 110, 120 need not have fixed roles but may be used versatilely, such that any of the stimulation electrodes 110, 120 may be selected to be the electrode that receives the anode voltage or the cathode voltage used for stimulation.

In some embodiments of the present technology, instead of the using a voltage for stimulation, a stimulation current may be used. Each of the pixel circuits 200 of the selected pixel group may selectively provide bidirectional currents to the first and second stimulation electrodes 110, 120, such that the first stimulation electrode 110 may be selected to be a cathode electrode or an anode electrode, or the second stimulation electrode 120 may be selected to be an anode electrode or a cathode electrode.

According to some embodiments of the present technology, the pixels 30 may be configured as a plurality of macro-pixels 300, with each macro-pixel 300 being comprised of a group of pixels 30 operatively connected to each other such that the macro-pixel 300 is comprised of electrodes formed from the pixels 30 of the group. For example, as schematically depicted in the top plan view of FIG. 9, each macro-pixel 300 may be comprised of a group of four pixels 30. A first common stimulation electrode 110a of the macro-pixel 300 may be formed by connecting together the first stimulation electrodes 110 of the group. A second common stimulation electrode 120a of the macro-pixel 300 may be formed by connecting together the second stimulation electrodes 120 of the group. A first common sensing electrode 130a of the macro-pixel 300 maybe formed by connecting together some or all of the second sensing electrodes 140 of the group. In the example shown in FIG. 9, one of the pixels 30 of the group of four pixels 30 has a centrally located second sensing electrode 140, which may serve as the first common sensing electrode 130a of the macro-pixel 300. The macro-pixel 300 may use any of the pixel circuits 200 of the pixels 30 of the group to selectively send signals to or read signals from the electrodes 110a, 120a, 130a. Any suitable means for interconnecting the group of pixels 30 to form the macro-pixel 300 may be used. For example, a patterned layer of conductive lines may be fabricated above the electrode level 102 of the pixels 30 using known semiconductor fabrication technologies to ensure electrical isolation is maintained between the electrodes 110a, 120a, 130a and to ensure that the electrodes 110a, 120a, 130a are electrically connected to the pixels 30 of the group. Alternatively, in some embodiments, the electrodes 110a, 120a, 130a of the macro-pixel 300 may be formed on a separate layer above the electrodes 110, 120, 130, 140 of the group of pixels 30 from which the macro-pixel 300 is formed and isolated from the electrodes 110, 120, 130, 140 by an insulating layer. Electrical interconnects may be formed using known semiconductor fabrication techniques to connect the electrode 110a with one or more of the electrodes 110 of the group of pixels 30; to connect the electrode 120a with one or more of the electrodes 120 of the group of pixels 30; and to connect the electrode 130a with one or more of the electrodes 140 of the group of the pixels 30. Thus, through use of post-fabrication processing, the array 20 of pixels 30 may be transformed into an array of macro-pixels, with each macro-pixel being comprised of an interconnected group of the pixels 30 of the array 20.

Figure 9:
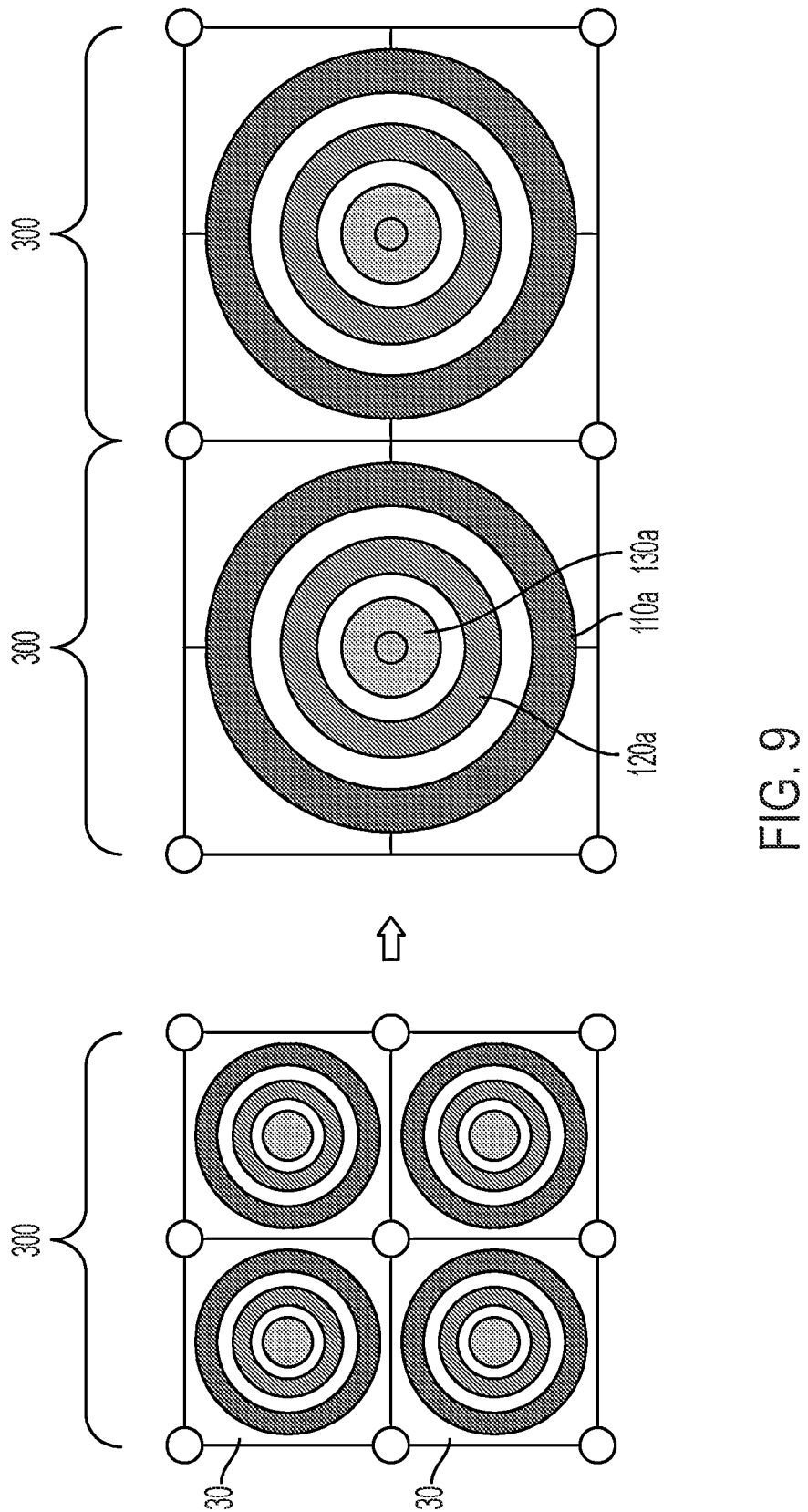
FIG. 9 schematically depicts a top plan view of a macro-pixel comprised of a plurality of interconnected pixels, according to some embodiments of the present technology.

Although the electrodes 110, 120, 110a, 120a are shown in FIGS. 8 and 9 to have an annular or ring form, they are not limited to such a shape. In some embodiments of the present technology, the electrodes 110, 120, 110a, 120a may be shaped differently (e.g., parallel stripes, nested rectangles, etc.)

Figure 10B:
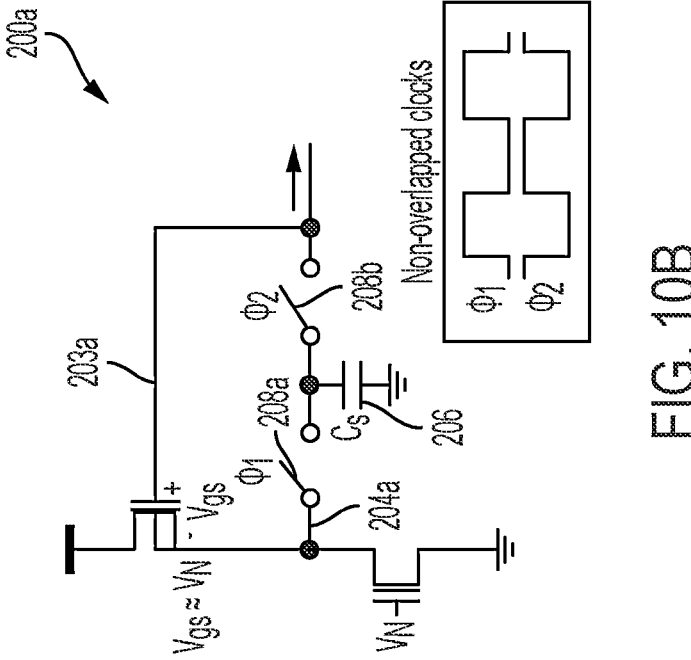
FIG. 10B shows a diagram of a pixel circuit, according to some embodiments of the present technology.
Figure 10A:
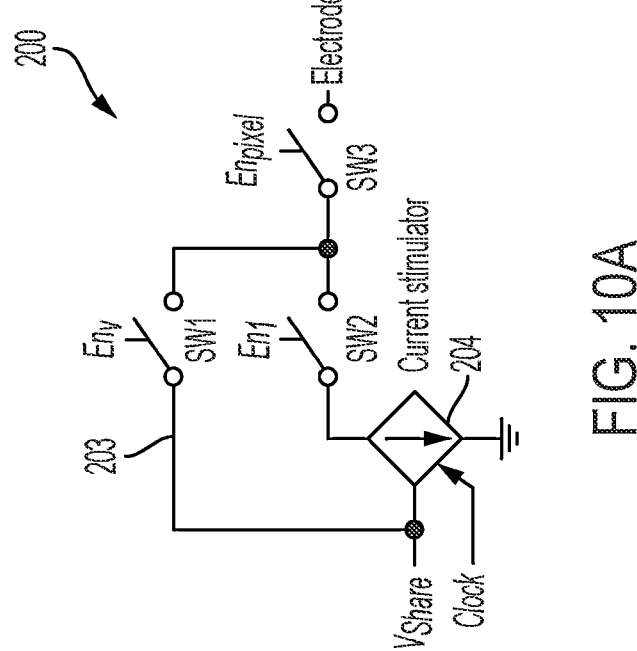
FIG. 10A shows a diagram of a pixel circuit, according to some embodiments of the present technology.

Each pixel circuit 200 may be configured according to the circuit diagram of FIG. 10A, according to some embodiments of the present technology. Alternatively, instead of the pixel circuit 200, each pixel 30 of the array 20 may be comprised of a pixel circuit 200a configured according to the circuit diagram of FIG. 10B, according to some embodiments of the present technology. In some embodiments, each pixel circuit 200 of the array 20 may be comprised of a voltage stimulator 203, a current stimulator 204 and a plurality of switches SW1, SW2, SW3. The voltage stimulator 203 may be configured to receive a voltage signal from the array voltage generator 52 and to output a stimulation voltage. The current stimulator 204 may be configured to receive the voltage signal from the array voltage generator 52 and to output a stimulation current. The switches SW1, SW2, SW3 may be configured to enable the stimulation voltage or the stimulation current to be provided to a selected electrode 110, 120 of the electrochemical cell 100 corresponding to the pixel circuit 30. The clock generator 54 of the stimulator circuitry 50 may provide clock signals to the array voltage generator 52 and each pixel circuit 200.

For example, electrode stimulation may be applied when an enable signal for stimulation $En_{pixel}$ is asserted at the switch SW3 in FIG. 10A. For voltage stimulation, a voltage $V_{Share}$, which may be shared by a group of pixels 30, may be applied through the voltage stimulator 203 when the switch SW1 receives an enable signal for voltage stimulation Env, thus causing the switch SW1 to close. In this case, the switch SW2 would be open (i.e., an enable signal for current stimulation Eni is not asserted). For current stimulation, the switch SW1 may be open and the switch SW2 may be closed to enable a signal from the current stimulator 204 to reach the switch SW3. In some embodiments, the current stimulator 204 converts the voltage $V_{Share}$ to a current used for stimulation. In some embodiments, the current stimulator 204 may be configured as described below for the pixel circuit 200a.

According to some embodiments in which the pixels 30 of the array 20 are comprised of the pixel circuits 200a, such as schematically depicted in FIG. 10B, each pixel circuit 200a of the array 20 may be comprised of a voltage stimulator 202a and a current stimulator 204a. The voltage stimulator 203a may be configured to receive a voltage signal from the array voltage generator 52 and to output a stimulation voltage. The current stimulator 204a may be configured to receive the voltage signal from the array voltage generator 52 and to output a stimulation current. The current stimulator 204a may be comprised of a switched capacitor 206 controlled by clock signals $\varphi_1$, $\varphi_2$ from the clock generator 54. The clock signals $\varphi_1$, $\varphi_2$ may be comprised of a first clock signal $\varphi_1$ and a second clock signal $\varphi_2$ configured to control a first switch 208a and a second switch 208b, respectively, such that the stimulation current provided by the current stimulator 204a may have a resolution as fine as 0.1 nA. In some embodiments, the resolution of the stimulation current may be in a range of 0.1 nA to 1 μA, or 0.1 nA to 100 μA, or 1 nA to 500 μA. In some embodiments, the first and second clock signals $\varphi_1$, $\varphi_2$ from may be non-overlapped signals, as schematically depicted in FIG. 10B. As will be appreciated, the stimulation current output from the current stimulator 200a may be a product of the voltage signal from the array voltage generator 52, the capacitance of the capacitor 206, and a frequency provided by the clock generator 54 as follows:

$$I=V_N \cdot C_S \cdot f_s,$$

where I represents the stimulation current, $V_N$ represents the voltage signal from the voltage generator 52, $C_S$ represents the capacitance of the capacitor 206, and $f_s$ represents the frequency of the clock signals $\varphi_1$, $\varphi_2$ provided by the clock generator. Thus, by controlling $V_N$ and $f_s$ for a given $C_S$, the resolution of I (i.e., the stimulation current) may be tightly controlled to approximately 0.1 nA. As will be appreciated, $V_N$ may be the same as $V_{Share}$.

Figure 11:
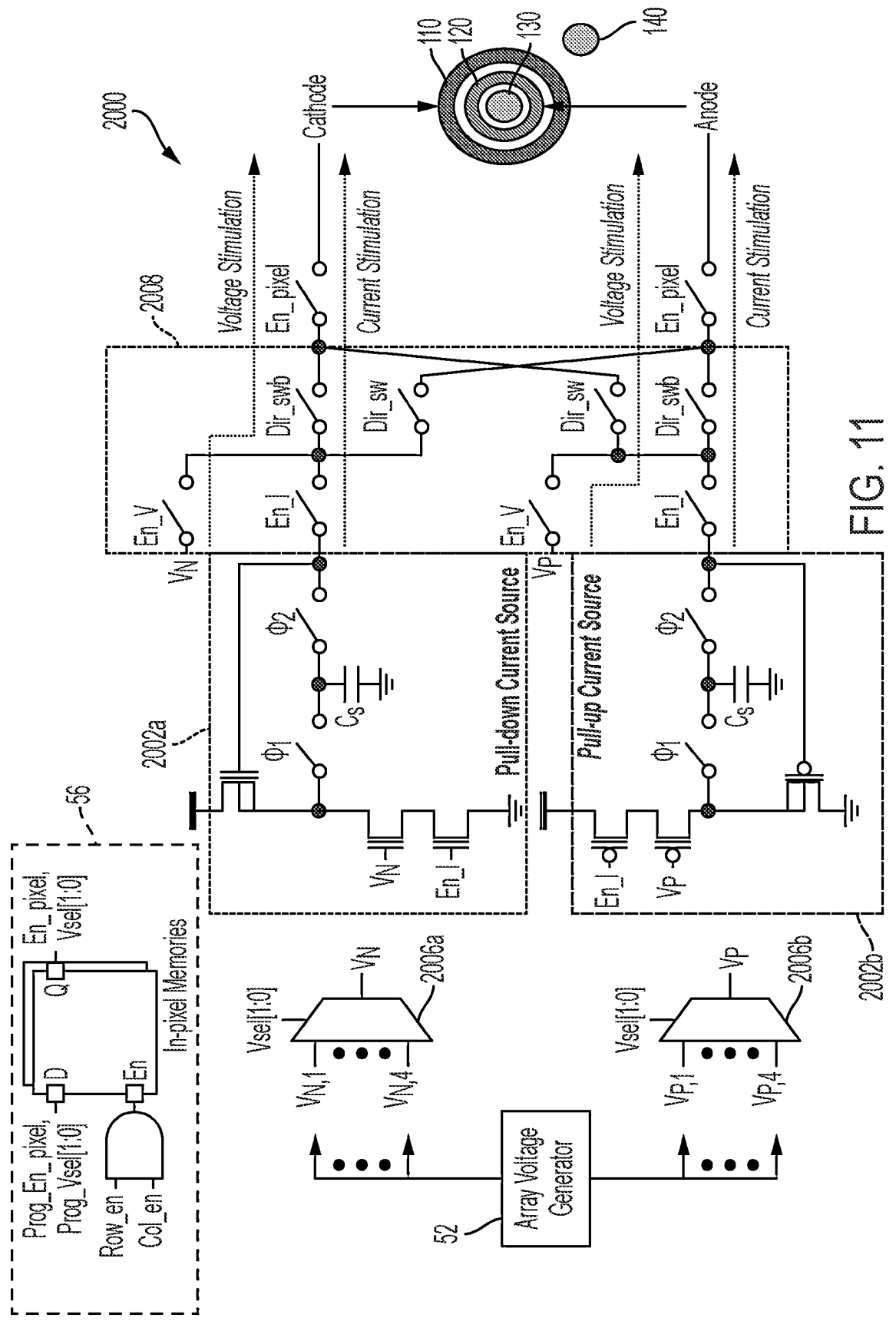
FIG. 11 schematically depicts a diagram of a pixel circuit in relation to an array voltage generator and electrodes of a pixel, according to some embodiments of the present technology.

As another alternative, instead of the pixel circuit 200, each pixel 30 of the array 20 may be comprised of a pixel circuit 2000 configured according to the circuit diagram of FIG. 11, according to some embodiments of the present technology. Each pixel circuit 2000 of the array 20 may be comprised of a cathode stimulator 2002a, an anode stimulator 2002b, and a plurality of switches. The cathode stimulator 2002a may be configured to receive a cathode voltage signal from the first generator portion 52a of the array voltage generator 52 and to output a stimulation voltage or a stimulation current to the first stimulation electrode 110 of the electrochemical cell 100 corresponding to the pixel circuit 2000. The anode stimulator 2002b may be configured to receive an anode voltage signal from the second generator portion 52b of the array voltage generator 52 and to output a stimulation voltage or a stimulation current to the second stimulation electrode 120 of the electrochemical cell 100 corresponding to the pixel circuit 2000. The switches may be configured to operate based on enable signals and/or configuration bits stored in the in-pixel memory 56 of the pixel circuit 2000. In some embodiments, the in-pixel memory 56 may be operatively connected to the cathode stimulator 2002a and the anode stimulator 2002b to selectively cause selection of the cathode voltage signal by the cathode stimulator 2002a or the anode voltage signal by the anode stimulator 2002b to be provided to an electrode. For example, enable signals stored in the in-pixel memory 56 may cause the switches to enable the first stimulation electrode 110 to be provided the stimulation voltage from the cathode stimulator 2002a and to enable the second stimulation electrode 120 to be provided the stimulation voltage from the anode stimulator 2002b, or the switches may enable the first stimulation electrode 110 to be provided the stimulation current from the cathode stimulator 2002a and to enable the second stimulation electrode 120 to be provided the stimulation current from the anode stimulator 2002b. As will be appreciated, the switches may be controlled in other ways to selectively provide current or voltage to the first stimulation electrode 110 and/or the second stimulation electrode 120 for the pixel 30.

In some embodiments of the present technology, each pixel circuit 2000 of the array 20 may be comprised of first and second multiplexers 2006a, 2006b. The first multiplexer 2006a may be operatively connected to the cathode stimulator 2002a and the array voltage generator 52 and may be configured to provide one of a plurality of cathode voltages generated by the array voltage generator 52. In some embodiments, the cathode voltage signal may be selected from the cathode voltages generated by the array voltage generator 52. The second multiplexer 2006b may be operatively connected to the anode stimulator 2002b and the array voltage generator 52 and may be configured to provide one of plurality of anode voltages generated by the array voltage generator 52. In some embodiments, the anode voltage signal may be selected from the anode voltages generated by the array voltage generator 52. In some embodiments, the cathode stimulator 2002a may select the cathode voltage signal from multiple cathode signals provided to the first multiplexer 2006a based on configuration bits stored in the in-pixel memory 56 of the pixel circuit 2000. In some embodiments, the anode stimulator 2002b may select the anode voltage signal from multiple anode signals provided to the second multiplexer 2006b based on configuration bits stored in the in-pixel memory 56 of the pixel circuit 2000.

In some embodiments of the present technology, each pixel circuit 2000 may be provided with a swap system 2008 that enables a direction of stimulation current to be swapped. In some embodiments, the swap system 2008 may be comprised of a plurality of switches that enable an output of the cathode stimulator 2002a and the output of the anode stimulator 2002b to applied to any of the first and second stimulation electrodes 110, 120. In some embodiments, the cathode stimulator 2002a may be a "pull-down" switched-capacitor current source that may apply a current to the first stimulation electrode 110 or the second stimulation electrode 120 based on a setting of the swap system 2008. Similarly, the anode stimulator 2002b may be a "pull-up" switched-capacitor current source that may apply a current to the first stimulation electrode 110 or the second stimulation electrode 120 based on a setting of the swap system 2008. In some embodiments, the swap system 2008 may be used advantageously to provide each pixel 30 with bi-directional current capabilities without increasing the number of current stimulators, and therefore bidirectionality may be achieved without a significant (if any) increase to a size or area of the pixel circuit 200.

Figure 12:
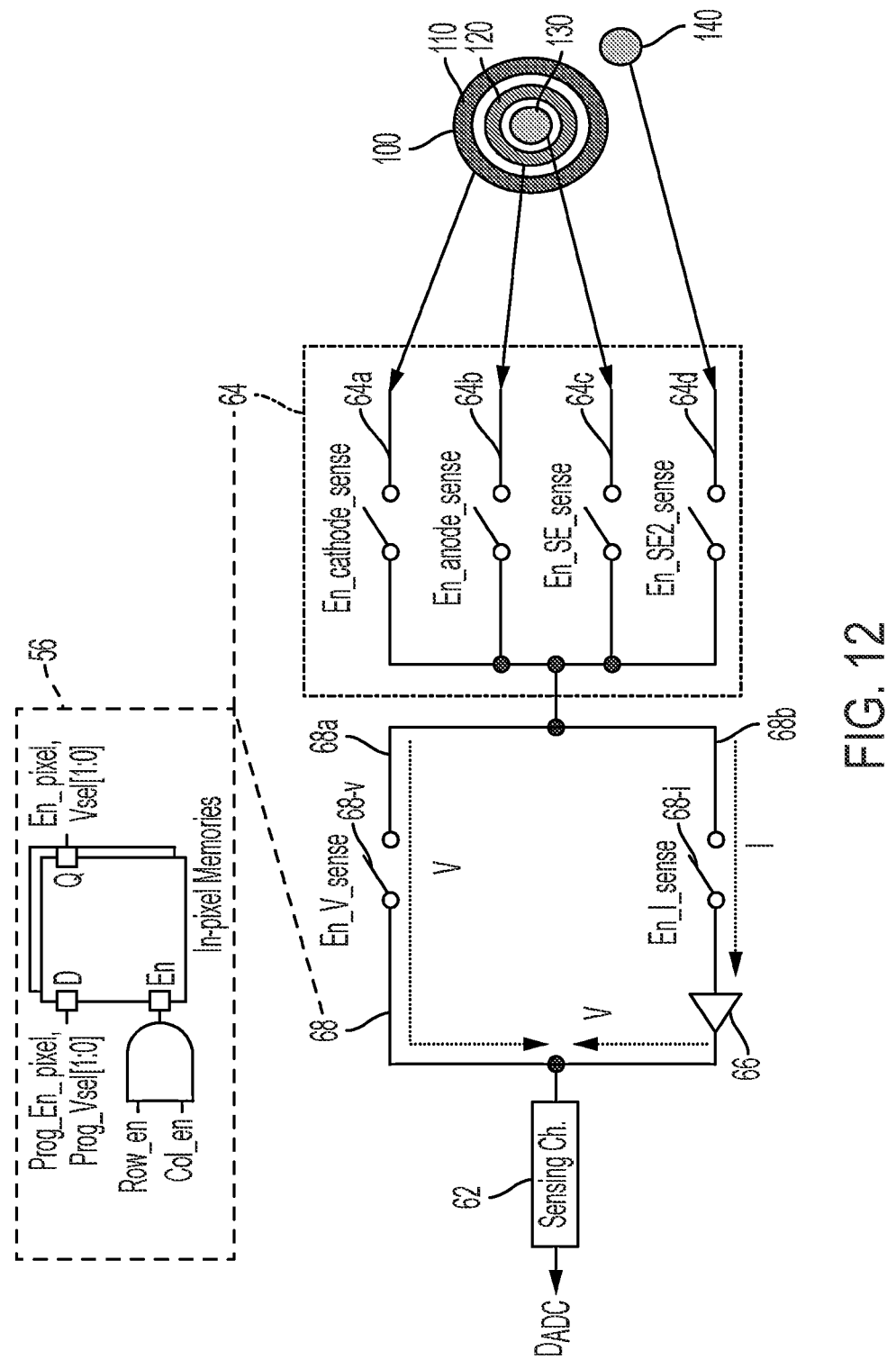
FIG. 12 schematically depicts circuitry for sensing signals from a pixel, according to some embodiments of the present technology.

As noted above, each sensing or readout channel 62 of the sensor circuitry 60 may be comprised of circuitry configured to read the output signals of the pixels 30 of a corresponding column of the pixel groups, according to some embodiments of the present technology. In some embodiments, each pixel circuit (200, 2000) of a pixel group may be comprised of a network 64 of electrode-sensing switches 64a, 64b, 64c, 64d and a readout switch 68 that operate together to enable a voltage or a current to be selectively sensed from each of the electrodes 110, 120, 130, 140, as schematically shown in FIG. 12. A first electrode-sensing switch 64a may be controlled to selectively close to connect the first stimulation electrode 110 to the readout switch 68 so that a voltage or a current may be sensed or read out from the first stimulation electrode 110. A second electrode-sensing switch 64b may be controlled to selectively close to connect the second stimulation electrode 120 to the readout switch 68 so that a voltage or a current may be sensed or read out from the second stimulation electrode 120. A third electrode-sensing switch 64c may be controlled to selectively close to connect the first sensing electrode 130 to the readout switch 68 so that a voltage or a current may be sensed or read out from the first sensing electrode 130. A fourth electrode-sensing switch 64d may be controlled to selectively close to connect the second sensing electrode 140 to the readout switch 68 so that a voltage or a current may be sensed or read out from the second sensing electrode 140. In some embodiments, the network 64 and the readout switch 68 may be connected to the in-pixel memory 56.

In some embodiments of the present technology, the readout switch 68 may be configured to permit a voltage or a current to be sensed by a sensing channel 62 corresponding to the pixel group to which the pixel 30 of the readout switch 68 belongs. In some embodiments, the readout switch 68 may have a voltage branch 68a and a current branch 68b. When sensing a voltage, a switch 68-i in the current branch 68b may be open and a switch 68-v may be closed, which then forces a readout-signal from a selected one of the electrodes 110, 120, 130, 140 to go through the voltage branch 68a to the sensing channel 62. When sensing a current, the switch 68-i in the current branch 68b may be closed and the switch 68-v may be open, which then forces a readout-signal from a selected one of the electrodes 110, 120, 130, 140 to go through the current branch 68b to the sensing channel 62. In some embodiments, the current branch 68b may be comprised of a transimpedance amplifier (TIA) device 66 configured to convert a sensed current to a voltage. As will be appreciated, measurement of current instead of voltage may enable, e.g., counting of charges that participate in an electrochemical reaction, and may enable comparisons to be made between electrochemical reactions performed under different conditions (e.g., different temperatures, different solutions, etc.).

In some embodiments of the present application, the TIA device 66 may be comprised of a buffer and a programmable TIA. With such a device, the readout switch 68 may be connected to each of the pixels 30 in the pixel group and collect current information from the pixels 30 of the pixel group. In some embodiments, the TIA device may be used to measure a current consumed by each pixel 30 of the pixel group as well as a total current consumed by the pixels 30 of the pixel group.

In some embodiments of the present technology, the channel multiplexer 67 of the sensor circuitry 60 may be operatively connected to the sensing channels 62 and may enable signals from the sensing channels 62 to be read out by the controller 75. In some embodiments, the channel multiplexer 67 may enable the controller 75 to selectively read out signals from each sensing channel 62 individually, and also may enable a particular group of pixels 30 or even a particular pixel 30 to be selected to be read out by the controller 75, via the pixel circuits 200 of the selected group of pixels 30 or via the pixel circuit of the selected particular pixel 30. In some embodiments, each sensing channel 62 may be comprised of an analog-to-digital converter (ADC) configured to receive an analog signal from the readout switch 68 and to provide a digital signal to the channel multiplexer 67.

In some embodiments of the present technology, the sensor circuitry 60 may be configured to read an OCV and also a current flow at each electrode of a selected pixel 30 or a selected group of pixels 30, and the reading may occur during stimulation of the selected pixel(s) 30. In some embodiments, the reading may occur in a time-division multiplexed manner.

Having thus described several aspects and embodiments of the present technology, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any feature(s) described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the present invention may be embodied as one or more method(s) in which various embodiments of the structures described above may be used. The acts performed as part of the one or more method(s) may be ordered in any suitable way.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An electrochemical apparatus, comprising;
an array of pixels disposed on a chip;
stimulator circuitry disposed on the chip and configured to provide electrical input signals to cause stimulation of the pixels of the array, wherein the stimulator circuitry is comprised of an array of pixel circuits, and the array of pixels is comprised of an array of electrochemical cells overlaying the array of pixel circuits, with each of the pixel circuits being operatively connected to a corresponding one of the electrochemical cells; and
sensor circuitry disposed on the chip and configured to read electrical output signals from the pixels of the array,
wherein:
the stimulator circuitry is configured to provide the input signals to cause stimulation of the pixels individually, and
the sensor circuitry is configured to selectively read the output signals from the pixels while the pixels are being stimulated.

2. The electrochemical apparatus of claim 1, wherein the sensor circuitry is configured to measure an open-circuit voltage (OCV) at each of the pixels while the pixels are being stimulated by the stimulator circuitry.

3. The electrochemical apparatus of claim 1, wherein the sensor circuitry is configured to measure a current flow at each of the pixels while the pixels are being stimulated by the stimulator circuitry.

4. The electrochemical apparatus of claim 1, wherein:
the array of pixels is comprised of pixel groups,
the stimulator circuitry includes an array voltage generator configured to provide stimulation voltages to the pixels of at least one of the pixel groups of the array, and
the sensor circuitry includes sensing channels, each sensing channel being comprised of circuitry configured to read the output signals of the pixels of a corresponding one of the pixel groups.

5. The electrochemical apparatus of claim 1, further comprising:
a controller configured to:
provide control signals to the stimulator circuitry to control the stimulator circuitry to stimulate the pixels of the array, and
provide control signals to the sensor circuitry to selectively route the output signals from the pixels to sensing channels of the sensor circuitry.

6. The electrochemical apparatus of claim 5, wherein the controller is comprised of a field-programmable gate array (FPGA) configured to:
receive input parameters,
output the control signals to the stimulator circuitry and the sensor circuitry, and
record measurement data from the sensor circuitry.

7. The electrochemical apparatus of claim 1, wherein, for each pixel of the array of pixels, the electrochemical cell is comprised of a plurality of electrodes arranged on an electrode level of the chip, and wherein the electrodes of the electrochemical cell are comprised of:
first and second stimulation electrodes, and
first and second sensing electrodes.

8. The electrochemical apparatus of claim 7, wherein:
the first and second stimulation electrodes are arranged as concentric rings and have a common region,
the first sensing electrode is located within the common region, and
the second sensing electrode is located outside of the common region and outside of the concentric rings.

9. The electrochemical apparatus of claim 1, wherein the array of pixels is comprised of a plurality of macro-pixels, with each macro-pixel being comprised of a group of four or more pixels.

10. The electrochemical apparatus of claim 9, wherein, for each macro pixel:
a first stimulation electrodes of the group of pixels are commonly connected to each other and collectively form a first common stimulation electrode, and
a second stimulation electrodes of the group of pixels are commonly connected to each other and collectively form a second common stimulation electrode.

11. The electrochemical apparatus of claim 10, wherein, for each macro pixel, a second sensing electrodes of the group of pixels are commonly connected to each other and collectively form a first common sensing electrode centrally located in the macro pixel.

12. The electrochemical apparatus of claim 11, wherein: each pixel circuit of the array of pixels is comprised of:

a voltage stimulator configured to receive a voltage signal from an array voltage generator and to output a stimulation voltage, a current stimulator configured to receive the voltage signal from the array voltage generator and to output a stimulation current, and a plurality of switches configured to enable the stimulation voltage or the stimulation current to be provided to a selected electrode of the electrochemical cell corresponding to the pixel circuit.

13. The electrochemical apparatus of claim 10, wherein each pixel circuit of the array of pixels is comprised of:

a cathode stimulator configured to receive a cathode voltage signal from a first generator portion and to output a stimulation voltage or a stimulation current to the first stimulation electrode of the electrochemical cell corresponding to the pixel circuit, an anode stimulator configured to receive an anode voltage signal from a second generator portion and to output a stimulation voltage or a stimulation current to the second stimulation electrode of the electrochemical cell corresponding to the pixel circuit, and a plurality of switches configured to:

enable the first stimulation electrode to be provided the stimulation voltage from the cathode stimulator and to enable the second stimulation electrode to be provided the stimulation voltage from the anode stimulator, or enable the first stimulation electrode to be provided the stimulation current from the cathode stimulator and to enable to the second stimulation electrode to be provided the stimulation current from the anode stimulator.

14. A method for performing an electrochemical reaction, the method comprising:

providing a stimulation current to a plurality of pixels disposed on a chip; and measuring an open-circuit voltage (OCV) at each of the pixels during the providing of the stimulation current, wherein the measuring of the OCV is performed using sensor circuitry disposed on the chip.

15. The method of claim 14, further comprising:

measuring a current flow at each of the pixels during the providing of the stimulation current, wherein the measuring of the current flow is performed using the sensor circuitry.

16. The method of claim 15, wherein the measuring of the current flow is performed during the measuring of the OCV.

17. The method of claim 14, wherein the providing of the stimulation current is comprised of providing the stimulation current to a cathode electrode or an anode electrode of each of the pixels.

18. The method of claim 17, wherein:

the sensor circuitry is comprised of a plurality of pixel circuits respectively disposed under electrodes of the pixels, and the measuring of the OCV is comprised of measuring a potential between first and second sensor electrodes of each of the pixels using the pixel circuits corresponding the pixels.

19. The method of claim 14, wherein:

the pixels are arranged in a plurality of pixel groups, the sensor circuitry is comprised of a plurality of sensor channels, and the measuring of the OCV is performed by each of the sensor channels for a corresponding one of the pixel groups.

\* \* \* \* \*